(12) United States Patent
Hafenrichter et al.

(10) Patent No.: US 11,385,204 B2
(45) Date of Patent: Jul. 12, 2022

(54) FAN-PROPELLED SURFACE-ADHERING APPARATUS FOR AUTOMATED MAINTENANCE OPERATIONS

(71) Applicant: The Boeing Company, Chicago, IL (US)

(72) Inventors: Joseph L. Hafenrichter, Auburn, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 781 days.

(21) Appl. No.: 16/216,096

(22) Filed: Dec. 11, 2018

(65) Prior Publication Data

US 2020/0182835 A1    Jun. 11, 2020

(51) Int. Cl.
*G01N 29/265* (2006.01)
*G01N 29/22* (2006.01)
*B60K 1/02* (2006.01)

(52) U.S. Cl.
CPC ......... *G01N 29/265* (2013.01); *G01N 29/225* (2013.01); *B60K 1/02* (2013.01); *G01N 2291/2693* (2013.01)

(58) Field of Classification Search
USPC .......................................................... 702/48
See application file for complete search history.

(56) References Cited

U.S. PATENT DOCUMENTS

| | | | |
|---|---|---|---|
| 4,413,905 A | 11/1983 | Holzapfel | |
| 5,135,356 A | 8/1992 | Shepherd | |
| 6,317,387 B1 * | 11/2001 | D'Amaddio | G01N 29/11 367/129 |
| 7,643,893 B2 | 1/2010 | Fray et al. | |
| 7,813,888 B2 | 10/2010 | Mian et al. | |
| 7,859,655 B2 | 12/2010 | Troy et al. | |
| 8,044,991 B2 | 10/2011 | Lea et al. | |
| 8,060,270 B2 | 11/2011 | Vian et al. | |
| 8,214,098 B2 | 7/2012 | Murray et al. | |
| 8,738,226 B2 | 5/2014 | Fray et al. | |
| 8,744,133 B1 | 6/2014 | Troy et al. | |
| 9,156,321 B2 | 10/2015 | Fray et al. | |
| 9,221,506 B1 | 12/2015 | Georgeson et al. | |
| 9,371,133 B2 | 6/2016 | Mays | |

(Continued)

*Primary Examiner* — Paul D Lee

(74) *Attorney, Agent, or Firm* — Ostrager Chong Flaherty & Broitman P.C.

(57) ABSTRACT

An apparatus for automated maintenance of limited-access areas on large structures. The apparatus is a rolling or sliding tool-equipped mobile platform that is adhered to a surface by operation of one or more adherence fans and then propelled across the surface by operation of one or more propulsion fans. The adherence and propulsion fans are coupled to a base made of semi-rigid material. The adherence fans produce suction forces in one or more suction zones to adhere the mobile platform to the surface. The propulsion fans produce thrust to propel the surface-adhered mobile platform in a desired direction across the surface. The tool-equipped mobile platform is capable of adhering to and moving over a non-level surface on a large structure while keeping standoff contact elements in contact with the surface regardless of surface contour. The propulsion fans, adherence fans and maintenance tool (e.g., an NDI sensor unit) are controlled by a computer system.

21 Claims, 17 Drawing Sheets

(56) References Cited

U.S. PATENT DOCUMENTS

| | | |
|---|---|---|
| 9,513,635 B1 | 12/2016 | Bethke et al. |
| 9,731,818 B2 | 8/2017 | Dekel et al. |
| 9,840,339 B1 | 12/2017 | O'Brien et al. |
| 2013/0024067 A1* | 1/2013 | Troy ................... F02K 1/1207 180/69.6 |
| 2018/0120196 A1 | 5/2018 | Georgeson et al. |
| 2020/0172232 A1* | 6/2020 | Abdellatif ............... G01S 17/89 |

\* cited by examiner

FAN-PROPELLED SURFACE-ADHERING APPARATUS FOR AUTOMATED MAINTENANCE OPERATIONS

BACKGROUND

This disclosure generally relates to automated systems for carrying maintenance tools across surfaces of structures, such maintenance tools including (but not limited to) sensors used in nondestructive inspection (NDI). In particular, this disclosure relates to apparatus for performing automated maintenance operations on structures such as airfoil-shaped bodies and aircraft fuselages.

As used herein, the term "maintenance" includes, but is not limited to, operations such as NDI, target or decal attachment, surface treatment, drilling, damage marking, placement of materials, coating removal, cleaning, sanding and painting. For the sake of illustration, the bulk of the following disclosure will focus on nondestructive inspection. However, it should be appreciated that at least some of the concepts disclosed below have application when performing other types of maintenance.

Nondestructive inspection of structures involves thoroughly examining a structure without harming the structure or requiring significant disassembly of the structure. Nondestructive inspection is advantageous for many applications in which a thorough inspection of the exterior and/or interior of a structure is required. Various types of sensors may be utilized to perform NDI. One or more sensors may scan the structure to be examined, acquiring NDI sensor data from the structure from which internal anomalies can be identified. The data acquired by the sensors is typically processed by a processing element, and the processed data may be presented to a user via a display.

With some current approaches in automated maintenance of structures having surfaces to be scanned, scanner drive motion is achieved via friction, which requires sufficient normal forces to enable shear forces between the wheels of the scanner and the structure (or wheels and a track). Lifting carts with umbilical cables holding a scanner (e.g., a self-propelled crawler vehicle equipped with an NDI sensor unit) may be placed on and moved along a surface of the structure to be inspected, but this approach can be complicated, costly, and time-consuming to set up and run. An alternative method for performing automated maintenance using devices that do not use motor-driven wheels would be advantageous, especially under circumstances wherein frictional forces between wheels and contacted surface are variable (e.g., when the surface is wet).

SUMMARY

The subject matter disclosed herein is directed to an apparatus for automated maintenance of structures such as airfoil-shaped bodies and aircraft fuselages. As used herein, the term "airfoil-shaped body" means an elongated body having two side surfaces which are connected by a leading edge having a curved (e.g., rounded) profile and which meet at a trailing edge having a sharp (e.g., angled) profile (such as a helicopter blade, an aircraft wing or a wind turbine blade). The automated apparatus may be tethered to an umbilical cable that enables communication and provides electrical power to drive rotation of a plurality of fans. In the alternative, the apparatus may be untethered and powered by battery, solar or internal combustion engine, with wireless communication.

The automated apparatuses disclosed herein are rolling or sliding tool-equipped mobile platforms that adhere to a surface by operation of one or more surface-adhering devices (referred to herein as "adherence fans") and then scan across the surface by operation of one or more propulsion fans. The adherence fans and propulsion fans are coupled to a base made of semi-rigid material. The adherence fans produce suction forces in one or more suction zones to cause the mobile platform to adhere to the surface. The propulsion fans produce thrust to propel the surface-adhered mobile platform in a desired direction across the surface. The tool-equipped mobile platform is capable of adhering to and moving over a level or non-level surface on a structure while keeping a plurality of standoff contact elements in contact with the surface regardless of surface contour. The propulsion fans, adherence fans and maintenance tool (e.g., an NDI sensor unit) are controlled by a computer system. The apparatus uses re-orientation of propulsion fans to move the maintenance tool continuously or intermittently across the surface of a structure in any desired direction while maintaining contact with the surface.

This disclosure uses the term "adherence" in a sense that may not be an "ordinary" meaning found in a non-technical dictionary. The various embodiments of a surface-adhering apparatus disclosed herein are capable of performing a maintenance function intermittently at different locations or continuously along a scan path on a surface. The surface adherence functionality is provided by one or more surface-adhering devices that produce suction forces that may hold the tool-equipped mobile platform on a non-level surface. In accordance with one proposed implementation, omnidirectional rolling elements (e.g., ball rollers) are provided to assist in aligning the semi-rigid base of the tool-equipped mobile platform with the surface being maintained. Alternatively, the base may be equipped with sliding blocks having low-friction surfaces which allow omnidirectional movement. The omni-directional rolling elements work in conjunction with the surface-adhering devices to enable the tool-equipped mobile platform to adhere to but still translate laterally over the surface of the structure. Thus, the term "adherence" as used herein means a type of adherence that allows the tool-equipped mobile platform to move laterally over a surface—not a type of adherence wherein the surface-adhered tool-equipped mobile platform is not movable laterally. As used herein, the term "lateral movement" includes movement along a surface in a direction parallel (if the surface is flat) or tangent (if the surface is convex curved) to the surface.

In accordance with some embodiments disclosed in some detail hereinafter, the fan-propelled tool-equipped mobile platform includes one or more surface-adhering devices configured with respective suction zones to enable the semi-rigid base of the platform to adhere to the surface being maintained. In one proposed implementation, each surface-adhering device includes a flexible skirt (or plural skirts) that bounds a suction zone and one or more adherence fans in fluid communication with the suction zone. For example, the adherence fan may be in the form of an electric ducted fan which is mounted in or directly above an opening formed in a semi-rigid base of the platform. The flexible skirt bounds a suction zone (e.g., a volume of space) and helps maintain low pressure (e.g., lower than the ambient pressure) in the suction zone. Omnidirectional rolling elements (e.g., ball rollers) positioned within each suction zone keep the associated skirt optimally offset from a surface of changing contour, so the mobile platform easily glides over even tight leading edge contours, while still adhering to the surface of the structure undergoing maintenance.

Although various embodiments of an apparatus for automated maintenance of structures using fan-propelled mobile platforms are described in some detail later herein, one or more of those embodiments may be characterized by one or more of the following aspects.

One aspect of the subject matter disclosed in detail below is a mobile platform for performing maintenance operations, comprising: a base having a first opening; a first skirt attached to or integrally formed with the base and surrounding the first opening in the base, the first skirt bounding a suction zone that is in fluid communication with the first opening; a maintenance tool mounted to the base; a first adherence fan rotatably coupled to the base and disposed to remove air from the suction zone via the first opening in the base; a first adherence fan motor operatively coupled for driving rotation of the first adherence fan; first and second propulsion fans having axes of rotation which are generally parallel to the base; first and second propulsion fan motors operatively coupled for driving rotation of the first and second propulsion fans respectively;

and a controller configured to control the operation of the first adherence fan motor and the first and second propulsion fan motors. Optionally, the mobile platform may further comprise first and second turrets rotatably coupled to the base and fixedly coupled to the first and second propulsion fan motors respectively; and first and second turret motors operatively coupled for driving rotation of the first and second turrets respectively, thereby enabling the first and second propulsion fan motors to swivel about respective axes of rotation under the control of the controller.

In accordance with some embodiments, the mobile platform described in the immediately preceding paragraph further comprises a plurality of standoff contact elements attached to the base. In one proposed implementation, the standoff contact elements are ball rollers; in another proposed implementation, the standoff contact elements have surfaces suitable for sliding along a continuous surface of a structure.

Another aspect of the subject matter disclosed in detail below is a system for performing maintenance operations, comprising an umbilical cable and a first mobile platform attached to the umbilical cable. The first mobile platform comprises: a first base having an opening; a skirt attached to or integrally formed with the first base and surrounding the opening in the first base, the skirt bounding a suction zone that is in fluid communication with the opening; a maintenance tool mounted to the first base; an adherence fan rotatably coupled to the first base and disposed to remove air from the suction zone via the opening in the first base; an adherence fan motor operatively coupled for driving rotation of the adherence fan; first and second propulsion fans having axes of rotation which are generally parallel to the base; first and second propulsion fan motors operatively coupled for driving rotation of the first and second propulsion fans respectively; and a controller configured to control the operation of the adherence fan motor and the first and second propulsion fan motors to enable concurrent surface adherence and fan propulsion.

In accordance with some embodiments, the system referred to in the immediately preceding paragraph further comprises a second mobile platform configured to manage extension and retraction of the umbilical cable. The second mobile platform comprises a second base and a spool mounted to the second base, a first portion of the umbilical cable being wound on the spool and a second portion of the umbilical cable extending between the spool and the first base of the first mobile platform. In one proposed implementation, the second mobile platform further comprises wheels and a boom arm that supports the second portion of the umbilical cable. In another proposed implementation, the second mobile platform further comprises further comprises a plurality of propulsion fans.

A further aspect of the subject matter disclosed in detail below is a method for automated maintenance of a structure, comprising: (a) attaching a tool-equipped mobile platform to one end of an umbilical cable; (b) suspending the attached tool-equipped mobile platform from the umbilical cable in a position adjacent to a surface of a structure; (c) moving the suspended tool-equipped mobile platform into proximity with the surface; (d) adhering the tool-equipped mobile platform to the surface using one or more fans to produce suction in a suction zone between the surface and a base of the tool-equipped mobile platform; (e) propelling the adhered tool-equipped mobile platform to a location on the surface by means of thrust produced by propulsion fans of the tool-equipped mobile platform; and (f) operating a maintenance tool of the tool-equipped mobile platform to perform a maintenance operation while the tool-equipped mobile platform is at the location.

Other aspects of methods for automated maintenance of structures using a fan-propelled mobile platform are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, methods for automated maintenance of various structures (such as wind turbine blades, helicopter blades and aircraft wings and fuselages) using a surface-adhered, fan-propelled, tool-equipped mobile platform will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
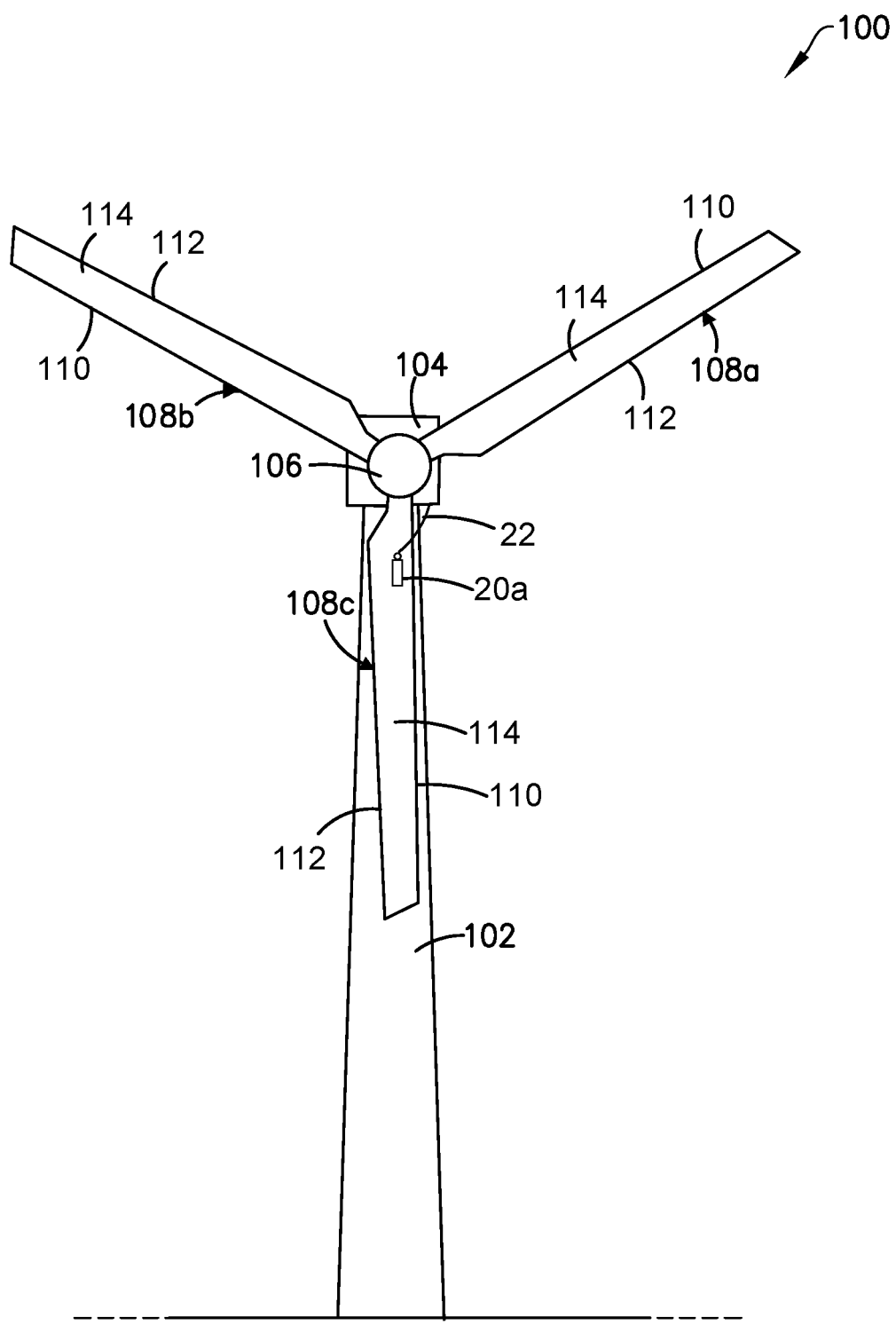
FIG. 1 is a diagram representing a front view of a wind turbine having a vertically disposed blade with a side surface to which a tool-equipped mobile platform is adhered. The tool-equipped mobile platform is also attached to an end of an umbilical cable suspended from the nacelle of the wind turbine.

FIG. 1 is a diagram representing a front view of a typical wind turbine 100. A typical wind turbine 100 has three wind turbine blades 108a-108c extending radially outward from a central hub 106, to which the roots of the wind turbine blades 108a-108c are attached. The hub 106 is rotatably coupled to a nacelle 104 that is supported at a height above ground by a tower 102. The wind turbine blades 108a-108c are configured to generate aerodynamic forces that cause the wind turbine to rotate in response to wind impinging on the blade surfaces. The nacelle 104 houses an electric generator (not shown in FIG. 1) which is operatively coupled to the hub 106. The electric generator is configured to generate electrical power as the hub 106 rotates.

Each of the wind turbine blades 108a-108c includes two side surfaces (only side surface 114 is visible in FIG. 1) which in profile converge to form a leading edge 110 and an acute angle having the trailing edge 112 at the vertex. When the wind turbine 100 operates, foreign matter or debris may become attached to the surfaces of the wind turbine blades 108a-108c. Also cracks or scratches may occur in the wind turbine blades 108a-108c during usage. Foreign matter on the surfaces of the wind turbine blades 108a-108c may degrade the efficiency of the wind turbine 100; cracks may propagate if not attended to. Periodic maintenance may be performed for removing foreign matter from the surfaces of the wind turbine blades 108a-108c or for detecting anomalies (e.g., cracks) in the wind turbine blades 108a-108c.

In the scenario depicted in FIG. 1, a maintenance tool-equipped mobile platform 20a (hereinafter "tool-equipped mobile platform 20a") has been attached to an end of an umbilical cable 22 and then lowered through an open hatch (not shown in FIG. 1) in the nacelle 104 to a position in front of wind turbine blade 108c at a 6-o'clock position. As will be described in more detail later, the tool-equipped mobile platform 20a incorporates suction means for enabling adherence to a surface of the wind turbine blade 108c. Maintenance operations may be performed while the tool-equipped mobile platform 20a is adhered to the surface of a blade in a generally vertical position, as depicted in FIG. 1.

When using mobile platforms equipped with automated tools in maintenance (e.g., inspection) applications, power and control signals need to be sent to the mobile platform, and data from onboard sensors, such as non-destructive inspection (NDI) equipment, needs to be sent from the mobile platform to a command center. In most applications this power and data transfer is handled by an umbilical cable. The umbilical cable may also include a hose that supplies water to the mobile platform in cases where the NDI equipment comprises one or more ultrasonic transducer arrays that use water as acoustic couplant. The umbilical cable is often heavier than the mobile platform, which can disrupt the motion of the crawler if the umbilical cable weight tension is not relieved, and extra umbilical cable length must be kept far enough away from the mobile platform to avoid entanglements. In alternative applications, the apparatus may be untethered and powered by battery, solar or internal combustion engine, with wireless communication.

In addition, when the mobile platform is used in situations where it may fall off the target object undergoing maintenance (e.g., inspection), the system should have a fall protection system. One class of fall protection devices for mobile platforms is safety tether umbilical cables. In some implementations, this safety tether umbilical cable may be combined with the power—data umbilical cable. In order to facilitate the use of remotely operated tool-equipped mobile platforms, a system for efficiently managing an umbilical cable and protecting the mobile platform and the environment from fall events is desired.

Figure 2:
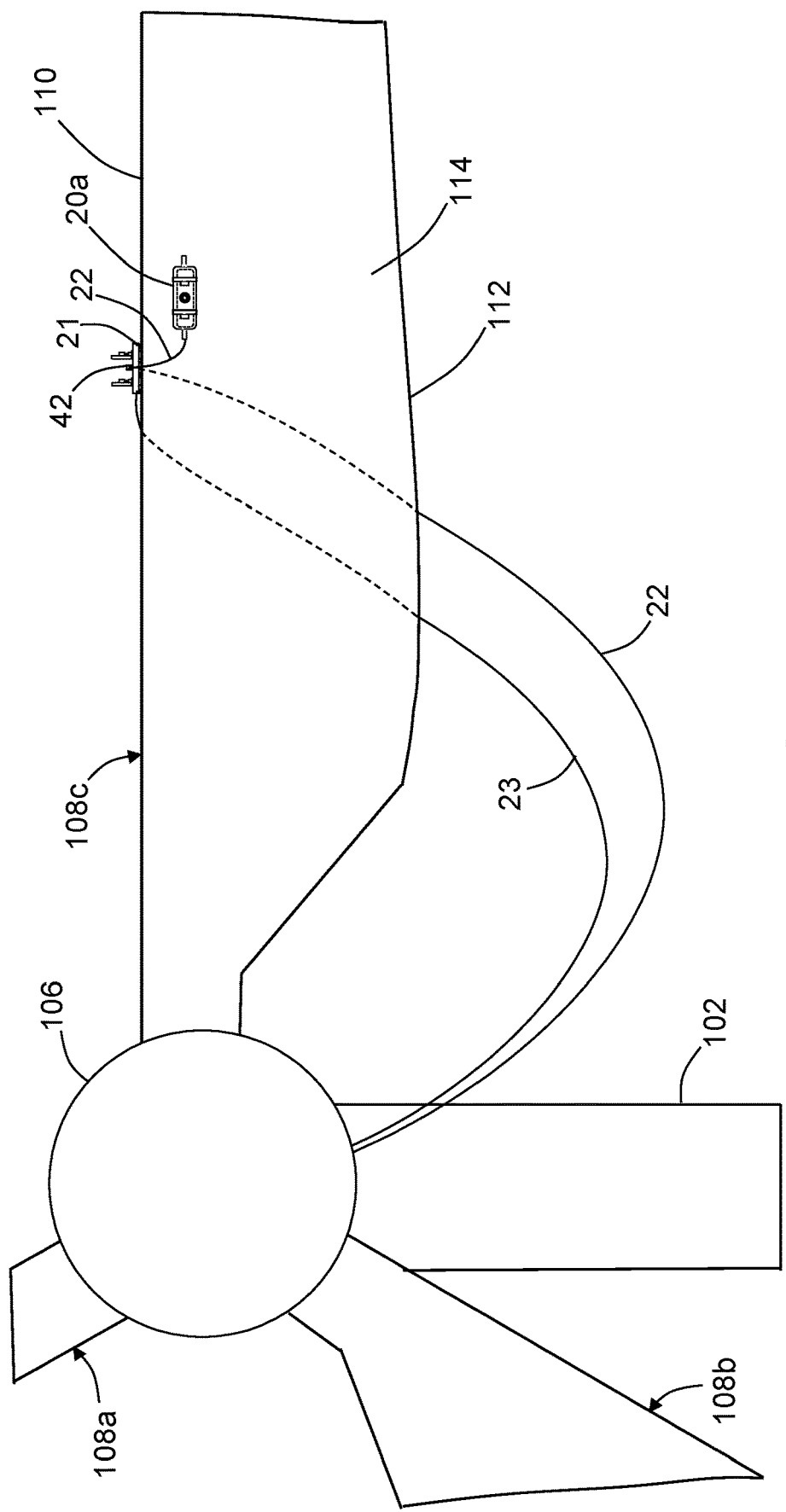
FIG. 2 is a diagram representing a front view of portions of a wind turbine having an umbilical cable-managing mobile platform mounted on a leading edge of the horizontally disposed blade and having a tool-equipped mobile platform adhered to a side surface of the horizontally disposed blade in accordance with one embodiment of an automated system for performing a maintenance function. The tool-equipped mobile platform is attached to an end of an umbilical cable suspended from a spool mounted to the umbilical cable-managing mobile platform.

FIG. 2 is a diagram representing a front view of portions of a wind turbine having an umbilical cable-managing mobile platform 21 (hereinafter "cable-managing mobile platform 21") adhered to a leading edge 110 of the horizontally disposed wind turbine blade 108c and having a tool-equipped mobile platform 20a adhered to a side surface 114 of the horizontally disposed blade 108c. The tool-equipped mobile platform 20a is attached to an end of an umbilical cable 22 suspended from a spool 42 mounted to the cable-managing mobile platform 21. The cable-managing mobile platform 21 is attached to the end of an umbilical cable 22. An intermediate portion of the umbilical cable 22 (e.g., one or more loops) is wound on the spool 42.

In accordance with one embodiment, the spool 42 on the cable-managing mobile platform 21 is operated in a "carry-through" mode, in which mode the spool 42 does not splay or capture cable length. Rather the spool 42 on the cable-managing mobile platform 21 takes the umbilical cable 22 coming from the nacelle 104 and feeds the umbilical cable 22 to the tool-equipped mobile platform 20a as needed to maintain an approximately constant tension in the section of umbilical cable 22 extending from the spool 42 to the tool-equipped mobile platform 20a. Preferably the spool 42 is rotated (by a spool motor not shown in FIG. 2) to a degree that the cable tension is maintained approximately constant as the tool-equipped mobile platform 20a moves across the side surface 114. The removal of slack from the section of umbilical cable 22 extending from the spool 42 to the tool-equipped mobile platform 20a helps to avoid entanglement of the umbilical cable 22. (This carry-through process is similar to the way a mountain climber's belay partner feeds just enough climbing rope through his hands to the person climbing up or down the mountain.) The umbilical cable 22 with constant tension also serves as a fall protection device in the event that the tool-equipped mobile platform 20a loses adherence to the surface of the wind turbine blade 108c. Similarly, the umbilical cable 23 serves as a fall protection device in the event that the cable-managing mobile platform 21 falls off of the wind turbine blade 108c.

Figure 3:
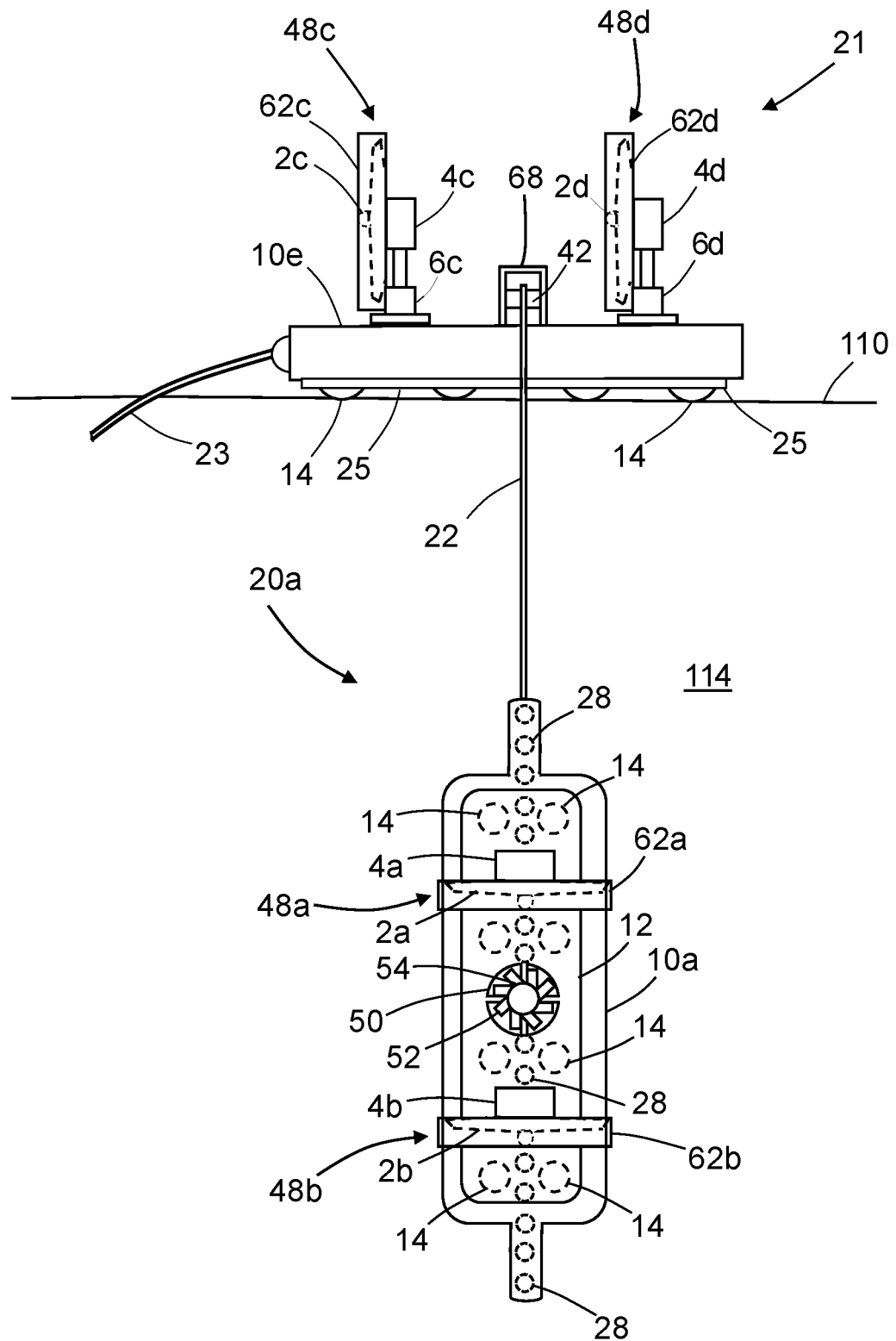
FIG. 3 is a diagram representing a view of the tool-equipped and umbilical cable-managing mobile platforms depicted in FIG. 2, but on a magnified scale.

FIG. 3 is a diagram representing a view of the tool-equipped mobile platform 20a and cable-managing mobile platform 21 depicted in FIG. 2, but on a magnified scale. The tool-equipped mobile platform 20a has a base 10a which is attached to the umbilical cable 22, a length of which is shown in FIG. 3 depending from a spool 42 which is rotatably coupled to a spool support 68. The spool support 68 is mounted to the base 10e of the cable-managing mobile platform 21. The base 10e of the cable-managing mobile platform 21 is attached to the umbilical cable 23. In addition, as described in more detail below, both mobile platforms have fans for propulsion and suction devices for surface adherence. Each fan may have two or more fan blades extending from a hub at equiangular intervals.

In accordance with the embodiment depicted in FIG. 3, the tool-equipped mobile platform 20a includes an adherence fan 52 which is rotatably coupled to a base 10a and disposed to remove air from a suction zone via an opening 50 in the base 10a. The adherence fan 52 is driven to rotate by an adherence fan motor 54. The suction zone is disposed between the base 10a and the side surface 114 of the wind turbine blade and bounded by a skirt 12 (described in more detail below). The tool-equipped mobile platform 20a further includes pivotable propulsion units 48a and 48b which are pivotably coupled to the base 10a. The pivotable propulsion units 48a and 48b comprise respective propulsion fans 2a and 2b (indicated by dashed lines in FIG. 3) which may be oriented and activated to propel the tool-equipped mobile platform 20a laterally in any direction across the side surface 114 during a maintenance procedure. The pivotable propulsion units 48a and 48b further comprise propulsion fan motors 4a and 4b operatively coupled for driving rotation of the propulsion fans 2a and 2b respectively. The propulsion fans 2a and 2b are protected against impacts by respective deflector rings 62a and 62b, which respectively surround the propulsion fans 2a and 2b.

Still referring to FIG. 3, the cable-managing mobile platform 21 also includes an adherence fan (not shown in FIG. 3) rotatably coupled to a base 10e and disposed to remove air from a suction zone via an opening (not shown in FIG. 3) in the base 10e. The suction zone is disposed between the base 10e and the leading edge 110 of the wind turbine blade and bounded by a skirt 25. The cable-managing mobile platform 21 further includes pivotable propulsion units 48c and 48d which are pivotably coupled to the base 10e. The pivotable propulsion units 48c and 48d comprise respective propulsion fans 2c and 2d (indicated by dashed lines in FIG. 3) which may be oriented and activated to propel the cable-managing mobile platform 21 laterally in any direction across a surface to which the platform is adhered. The pivotable propulsion units 48c and 48d further comprise propulsion fan motors 4c and 4d operatively coupled for driving rotation of the propulsion fans 2c and 2d respectively. The propulsion fans 2c and 2d are protected against impacts by respective deflector rings 62c and 62d, which respectively surround the propulsion fans 2c and 2d. The cable-managing mobile platform 21 further includes a plurality of ball rollers 14 which enable the cable-managing mobile platform 21 to roll laterally without friction across the surface to which the platform is adhered.

In accordance with one proposed procedure for installing the system depicted in FIG. 3 on a wind turbine 100, first the wind turbine blade 108c is oriented in the 6-o'clock position (shown in FIG. 1). Then the cable-managing mobile platform 21 is lowered through the nacelle hatch (not shown in drawings) and maneuvered into place onto a surface of the wind turbine blade 108c with directed thrusting of the adherence fan (not shown in FIG. 3) and the propulsion fans 2c and 2d. Thereafter the tool-equipped mobile platform 20a is lowered through the nacelle hatch and maneuvered into place onto the surface of the wind turbine blade 108c with directed thrusting of the adherence fan 52 and propulsion fans 2a and 2b. The tool-equipped mobile platform 20a and cable-managing mobile platform 21 are then maneuvered about the blade surface until the platforms are oriented in such a way that the influence of the weight of the tool-equipped mobile platform 20a is negated by the belaying effect of the cable-managing mobile platform 21. Removal of the tool-equipped mobile platform 20a and cable-managing mobile platform 21 from the blade surface would happen in a reverse sequence.

Figure 4:
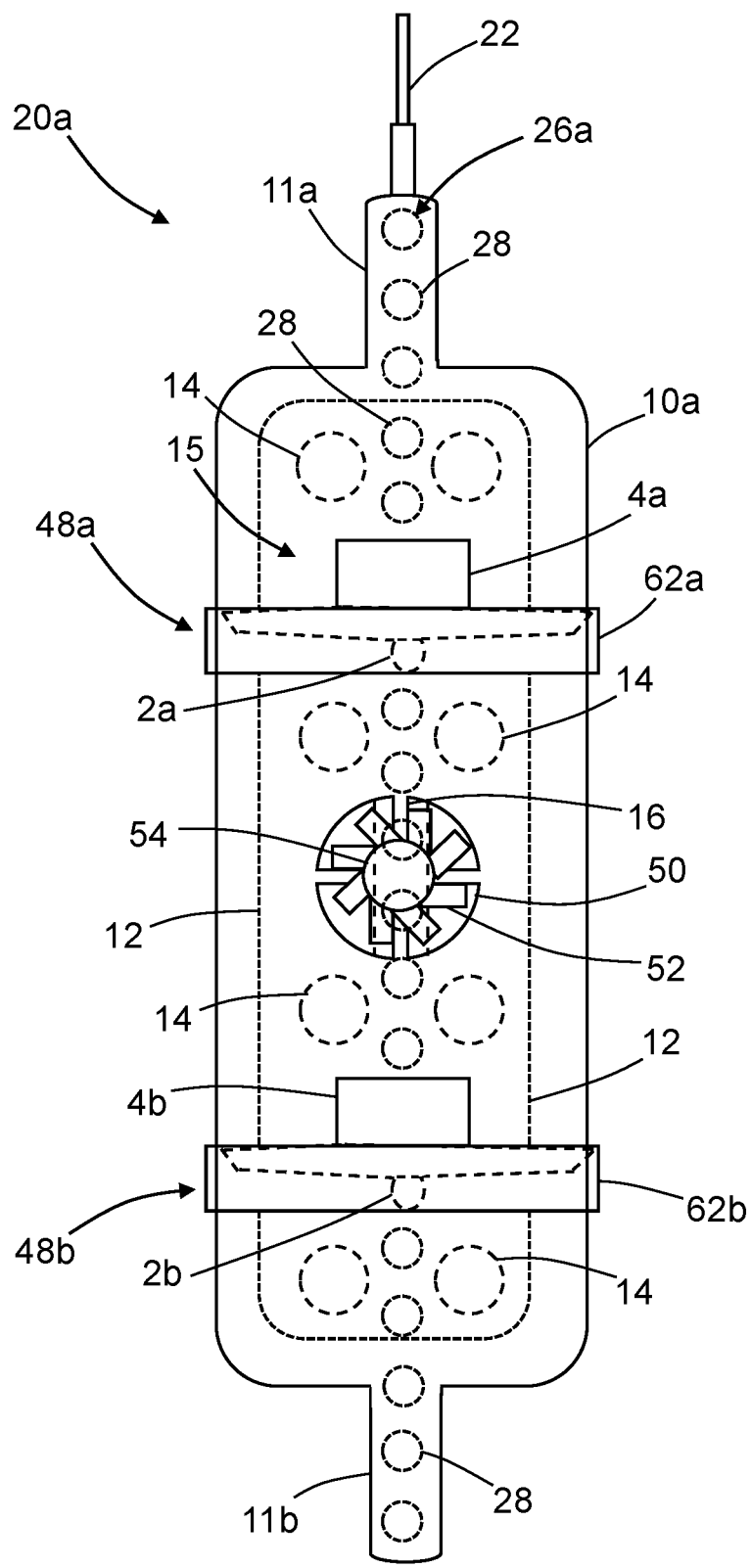
FIG. 4 is a diagram representing a plan view of the tool-equipped mobile platform depicted in FIG. 3, but on a further magnified scale. In accordance with the embodiment depicted in FIG. 4, the tool-equipped mobile platform includes one adherence fan, two propulsion fans and a linear array of sensors.

FIG. 4 is a diagram representing a plan view of the tool-equipped mobile platform 20a depicted in FIG. 3, but on a further magnified scale. In accordance with the embodiment depicted in FIG. 4, the tool-equipped mobile platform 20a has a base 10a with two base extensions 11a and 11b projecting in cantilevered fashion from opposing ends of the base 10a. In this example, the mobile platform 20a is equipped with a maintenance tool in the form of a linear array 26a consisting of a plurality of sensors 28 (indicated by small dashed circles in FIG. 4) arranged in spaced relationship along a line. The linear array 26a may extend from base extension 11a, through the opening 50 and to the base extension 11b. As seen in FIG. 4, some of the sensors 28 of the linear array 26a are mounted to (e.g., embedded) in the base extensions 11a and 11b and others are mounted to (e.g., embedded in) the portion of the base 10a disposed between the base extensions 11a and 11b. In addition, the base 10a of the tool-equipped mobile platform 20a has an opening 50. The sensors 28 of the linear array 26a may be placed along a line that is offset from a centerline of the base 10a by a sufficient distance to avoid passing through and partially blocking the opening 50.

Still referring to FIG. 4, the adherence fan 52 is situated directly above the opening 50. A flexible skirt 12 projects downward and bounds a volume of space underneath the base 10a which serves as a suction zone 15. The skirt 12 is attached to or integrally formed with the base 10a and surrounds the opening 50 in the base 10a. In the example depicted in FIG. 4, the skirt 12 has a generally rectangular footprint with four rounded corners. The suction zone 15 is in fluid communication with the opening 50 such that when the adherence fan 52 is activated to rotate in a reverse thrust direction, air is pulled out of the suction zone 15 via the opening 50. A plurality of ball rollers 14 (indicated by large dashed circles in FIG. 4) are coupled to the bottom of the base 10a within the boundary of the suction zone 15. The ball rollers 14 facilitate lateral movement of the tool-equipped mobile platform 20a and also act as standoff contact elements which maintain the sensors 28 at a specified distance from the surface undergoing inspection.

The tool-equipped mobile platform 20a depicted in FIG. 4 further includes an adherence fan motor 54 which is operatively coupled for driving rotation of the adherence fan 52. In addition, the tool-equipped mobile platform 20a includes propulsion fans 2a and 2b having axes of rotation which are generally parallel to the base 10a, and propulsion fan motors 4a and 4b operatively coupled for driving rotation of the propulsion fans 2a and 2b respectively. Operation of the motors and tool onboard the tool-equipped mobile platform 20a is controlled by a controller (not shown in FIG. 4, but see controller 70 in FIG. 11). In particular, the controller is configured to control the operation of the adherence fan motor 54 and the propulsion fan motors 4a and 4b to adhere the tool-equipped mobile platform 20a to a surface and move the surface-adhered tool-equipped mobile platform 20a along a desired scan path.

Figure 5:
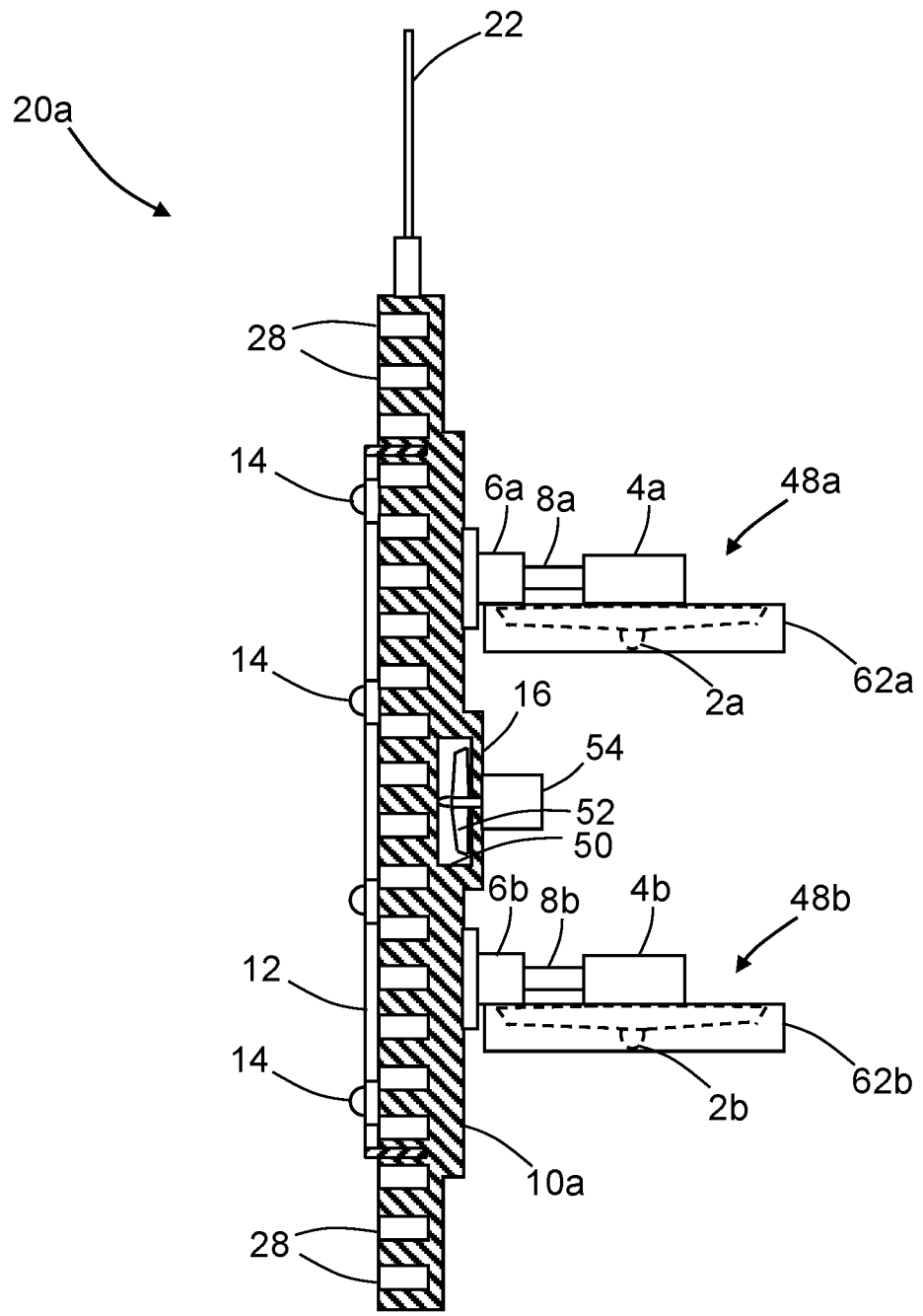
FIG. 5 is a diagram representing a partially sectioned side view of the tool-equipped mobile platform depicted in FIG. 4. Only the base and skirt are shown in section, the section plane being coplanar with a plane that bisects the sensors (not sectioned in FIG. 5).

Other components of the tool-equipped mobile platform 20a are visible in the partially sectioned view shown in FIG. 5. Only the base 10a and skirt 12 are shown in section. The section plane is coplanar with a plane that bisects the sensors 28 (not sectioned in FIG. 5). The base 10a—which is made of semi-rigid material and capable of flexure—is shown in a planar state in FIG. 5, in which case the bottom edge of the skirt 12 lies in a plane perpendicular to the section plane. As seen in FIG. 5, the ball rollers 14 are disposed within the skirt 12 and maintain the bottom edge of skirt 12 at a specified distance from any confronting planar surface to which the tool-equipped mobile platform 20a is adhered. In the alternative, ball rollers may be disposed outside the skirt, The specific flexibility of the base 10a may vary in dependence on the degree of curvature of the surface being inspected. Candidate materials that may be employed to create the semi-rigid base include butyl rubber, thin Delron plastic, silicon rubber reinforced with composite strips, etc. Further development will entail determining how much flexibility is required, and blending that with the skirt configuration to optimize base stiffness. Different material thicknesses across the base may also emerge in the development phase.

FIG. 5 shows the adherence fan 52 disposed inside a circular cylindrical opening 50 formed in the base 10a. The adherence fan 52 is driven to rotate by the adherence fan motor 54. The adherence fan motor 54 is supported by an adherence fan motor support 16. As best seen in FIG. 4, the adherence fan motor support 16 may be in the form of four radial struts or spokes disposed at right angles above the opening 50.

FIG. 5 further provides a view of additional components of the pivotable propulsion units 48a and 48b which are not visible in FIG. 4. As previously mentioned, the pivotable propulsion units 48a and 48b comprise respective propulsion fans 2a and 2b (indicated by dashed lines in FIG. 5) which may be oriented and activated to propel the tool-equipped mobile platform 20a laterally in any direction across the surface undergoing inspection. The pivotable propulsion units 48a and 48b further comprise respective propulsion fan motors 4a and 4b operatively coupled for driving rotation of the propulsion fans 2a and 2b respectively. The propulsion fans 2a and 2b are protected by respective deflector rings 62a and 62b. The pivotable propulsion units 48a and 48b further include respective turrets 6a and 6b rotatably coupled to the base 10a and fixedly coupled to the propulsion fan motors 4a and 4b respectively by respective shafts 8a and 8b. The pivotable propulsion units 48a and 48b further include turret motors (not shown in FIGS. 4 and 5, but see turret motors 56 in FIG. 11) operatively coupled for driving rotation of the turrets 6a and 6b respectively, thereby enabling the propulsion fan motors 2a and 2b to swivel about respective axes of rotation under the control of a controller. In the example, depicted in FIGS. 4 and 5, the opening 50 in the base 10a is disposed midway between the turrets 6a and 6b.

In accordance with one proposed implementation, the sensors 28 are ultrasonic transducers. In accordance with another proposed implementation, the sensors 28 are eddy current coils. The electrical connections to sensors 28 are not shown. The linear array 26a of sensors 28 may extend across the opening 50, as shown in FIG. 4. In an alternative embodiment, a pair of linear sensor arrays may be disposed on opposite sides of the opening with no sensors 28 across the opening 50.

As previously mentioned, the base 10a has a plurality of standoff contact elements attached thereto, which standoff contact elements are used to maintain the sensors 28 at a specified distance from the surface being interrogated. In the example depicted in FIGS. 4 and 5, the standoff contact elements are ball rollers 14. In an alternative proposed implementation, the standoff contact elements have low-friction surfaces suitable for sliding along a continuous surface of a structure.

Figure 6:
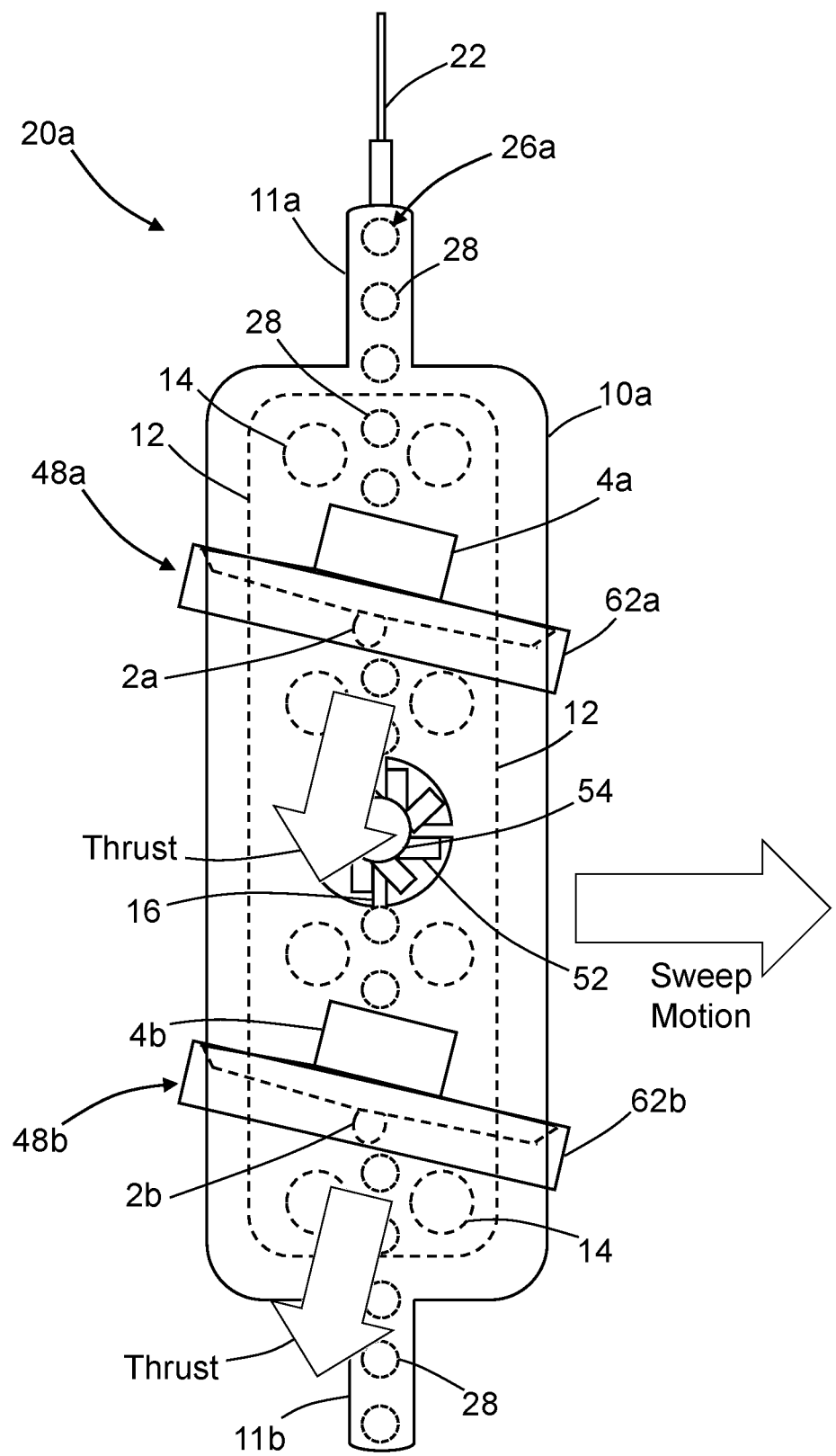
FIG. 6 is a diagram representing a plan view of the tool-equipped mobile platform depicted in FIG. 4 in a state wherein the tool-equipped mobile platform is moving laterally by means of fan propulsion while the base is adhered to the surface with an orientation such that the sensors are aligned generally vertically. The horizontal arrow indicates the direction of sweep motion, while the arrows pointing downward indicate the directions of the thrusts being produced by respective propulsion fans.

FIG. 6 is a diagram representing a plan view of the tool-equipped mobile platform 20a depicted in FIG. 4 in a state wherein the platform is being moved sideways in a generally horizontal direction. As the platform moves sideways, the generally vertically aligned linear array 26a of sensors 28 is swept in a generally horizontal direction across the surface to be scanned. In the scenario depicted in FIG. 6, both propulsion fans 2a and 2b have been oriented to produce mutually parallel thrust vectors when activated, each vector having vertical and horizontal components. The thrust vectors are indicated by respective arrows in FIG. 6. The sum of the magnitudes of the vertical components of the two thrust vectors may be approximately equal to the weight of the tool-equipped mobile platform 20a, thereby enabling the tool-equipped mobile platform 20a to "float" or "hover" while adhered to the surface being inspected. Increasing the thrust would cause the platform to ascend; decreasing the thrust would cause the platform to descend. Due to the horizontal components of the thrust vectors, the tool-equipped mobile platform 20a is propelled sideways in a direction indicated by the arrow bearing the label "Sweep Motion", which sideways direction may be horizontal.

Figure 7:
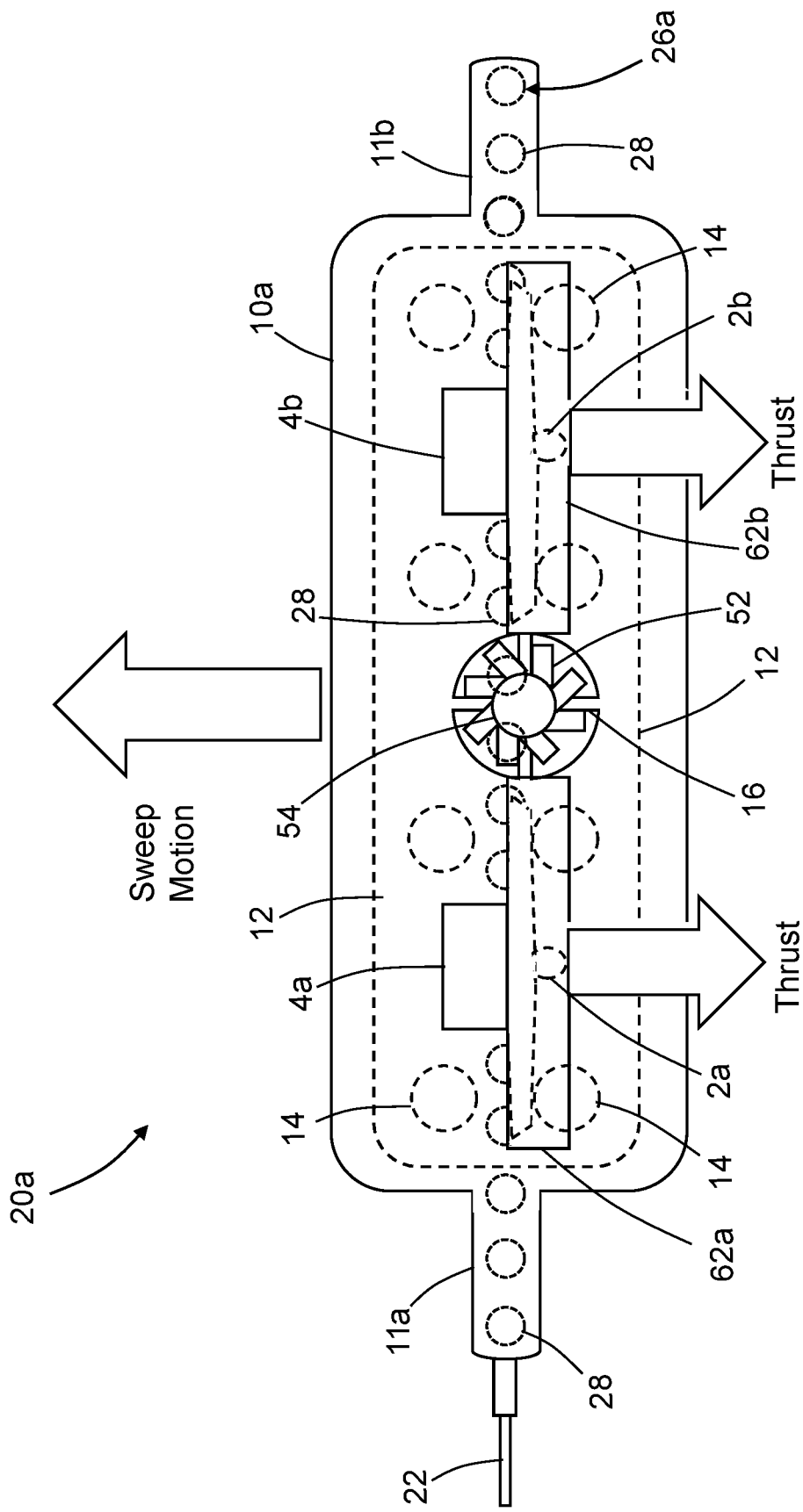
FIG. 7 is a diagram representing a plan view of the tool-equipped mobile platform depicted in FIG. 4 in a state wherein the tool-equipped mobile platform is moving upward by means of fan propulsion while the base is adhered to the surface being scanned with an orientation such that the sensors are aligned generally horizontally. The vertical arrow indicates the direction of sweep motion, while the arrows pointing downward indicate the directions of the thrusts being produced by respective propulsion fans.

FIG. 7 is a diagram representing a plan view of the tool-equipped mobile platform 20a depicted in FIG. 4 in a state wherein the tool-equipped mobile platform 20a is moving upward by means of fan propulsion while the base 10a is adhered to the surface being scanned with an orientation such that the sensors 28 are aligned generally horizontally. The vertical arrow indicates the direction of sweep motion, while the arrows pointing downward indicate the directions of the thrusts being produced by the propulsion fans 2a and 2b. The sum of the magnitudes of the two vertical thrust vectors is greater than the weight of the tool-equipped mobile platform 20a, thereby enabling the tool-equipped mobile platform 20a to rise upward. Such upward movement may be used to fully cover the surface areas adjacent to edges and tips of a wind turbine blade.

The tool-equipped mobile platform 20a shown in FIGS. 4-7 includes eight standoff contact elements in the form of respective ball rollers 14 (a.k.a.

ball-and-socket bearings). In one alternative embodiment, standoff contact elements are pivotably coupled sliding blocks capable of adjusting their angular position to lie flat on a non-planar surface when the standoff contact elements are placed in contact with that non-planar surface. The sliding blocks have low-friction surfaces suitable for sliding along a surface of a structure. Preferably the base 10a of the tool-equipped mobile platform 20a is configured so that all of the standoff contact elements contact a surface (e.g., a planar surface) at the same time.

In accordance with one example implementation of the tool-equipped mobile platform 20a depicted in FIGS. 4-7, the axis of rotation of the adherence fan 52 may be perpendicular to a planar surface when the standoff contact elements are all in contact with that planar surface, while the axes of rotation of the propulsion fans 2a and 2b are parallel to the planar surface and perpendicular to the axis of rotation of the adherence fan 52. Thus the propulsion fans 2a and 2b may be activated to produce respective thrust vectors that cause the tool-equipped mobile platform 20a to move parallel to the planar surface while in contact with that surface. If the thrust vectors produced by the propulsion fans 2a and 2b are parallel and in the same direction, then the movement of the tool-equipped mobile platform 20a will be translation. If the thrust vectors produced by the propulsion fans 2a and 2b are parallel and in opposite directions, then the movement of the tool-equipped mobile platform 20a will be rotation. If the tool-equipped mobile platform 20a is adhered to a convex curved surface, then the movements will conform to the contour of that surface.

The configuration of adherence and propulsion fans onboard the tool-equipped mobile platform 20a is one example presented for the purpose of illustration. Many other fan configurations are possible. Additional examples of suitable fan configurations will now be described with reference to FIGS. 8-10.

Figure 8:
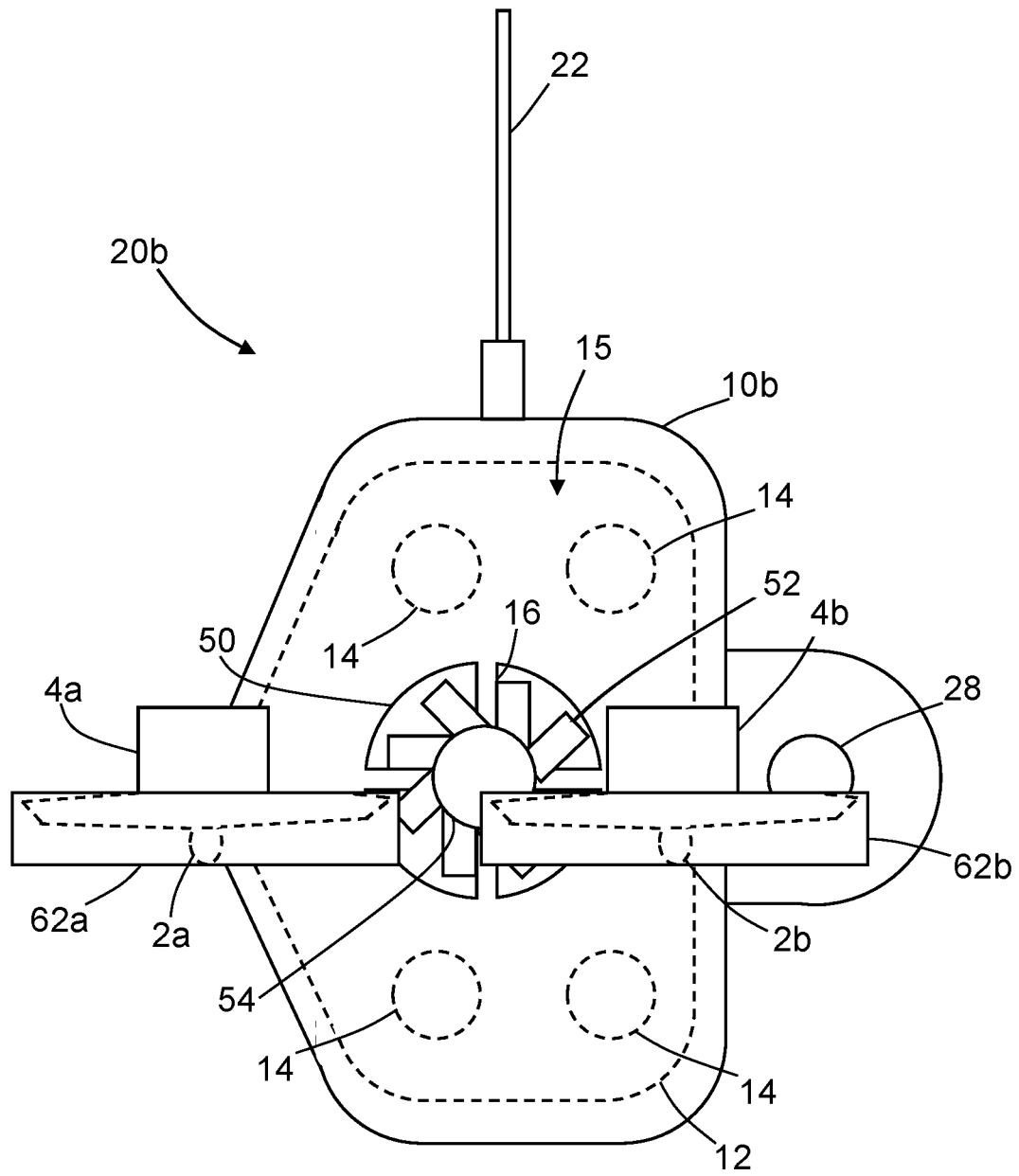
FIG. 8 is a diagram representing a plan view of a tool-equipped mobile platform having one adherence fan, two propulsion fans and one sensor in accordance with an alternative embodiment.

FIG. 8 is a diagram representing a plan view of a tool-equipped mobile platform 20b having one adherence fan 52, two propulsion fans 2a and 2b (indicated by dashed lines), and one sensor 28 in accordance with an alternative embodiment. The base 10b of tool-equipped mobile platform 20b is attached to the end of an umbilical cable 22. The tool-equipped mobile platform 20b has a skirt 12 (indicated by a dashed line) that is attached to and projects out of the base 10b toward the confronting surface. The skirt 12 bounds a suction zone 15. The tool-equipped mobile platform 20b further includes four ball rollers 14 (indicated by dashed circles) disposed within the suction zone 15. The suction zone 15 is further bounded by the bottom surface of the base 10b and the confronting surface that the ball rollers 14 are in contact with. In alternative embodiments, the number of ball rollers may be three, five or more. Surface adherence is achieved by activating the adherence fan 52 to rotate in a direction that exhausts air from the suction zone 15. The propulsion fans 2a and 2b may be mounted to respective rotatable turrets (not shown in FIG. 8) which enable the directions of the respective propulsion fan thrust vectors to be varied independently. The sensor 28 may be translated along a straight path by orienting the propulsion fans 2a and 2b so that their respective thrust vectors are parallel in direction and equal in magnitude. The sensor 28 may be carried along a circular path by orienting the propulsion fans 2a and 2b so that their respective thrust vectors are opposite in direction and equal in magnitude. To allow freedom of movement of the base 10b during operation of the propulsion fans 2a and 2b, the umbilical cable 22 should be maintained in a tension-free state by adjusting the length of cable extending between spool 42 (see FIG. 3) and base 10b to maintain some slack in the umbilical cable 22.

Figure 9:
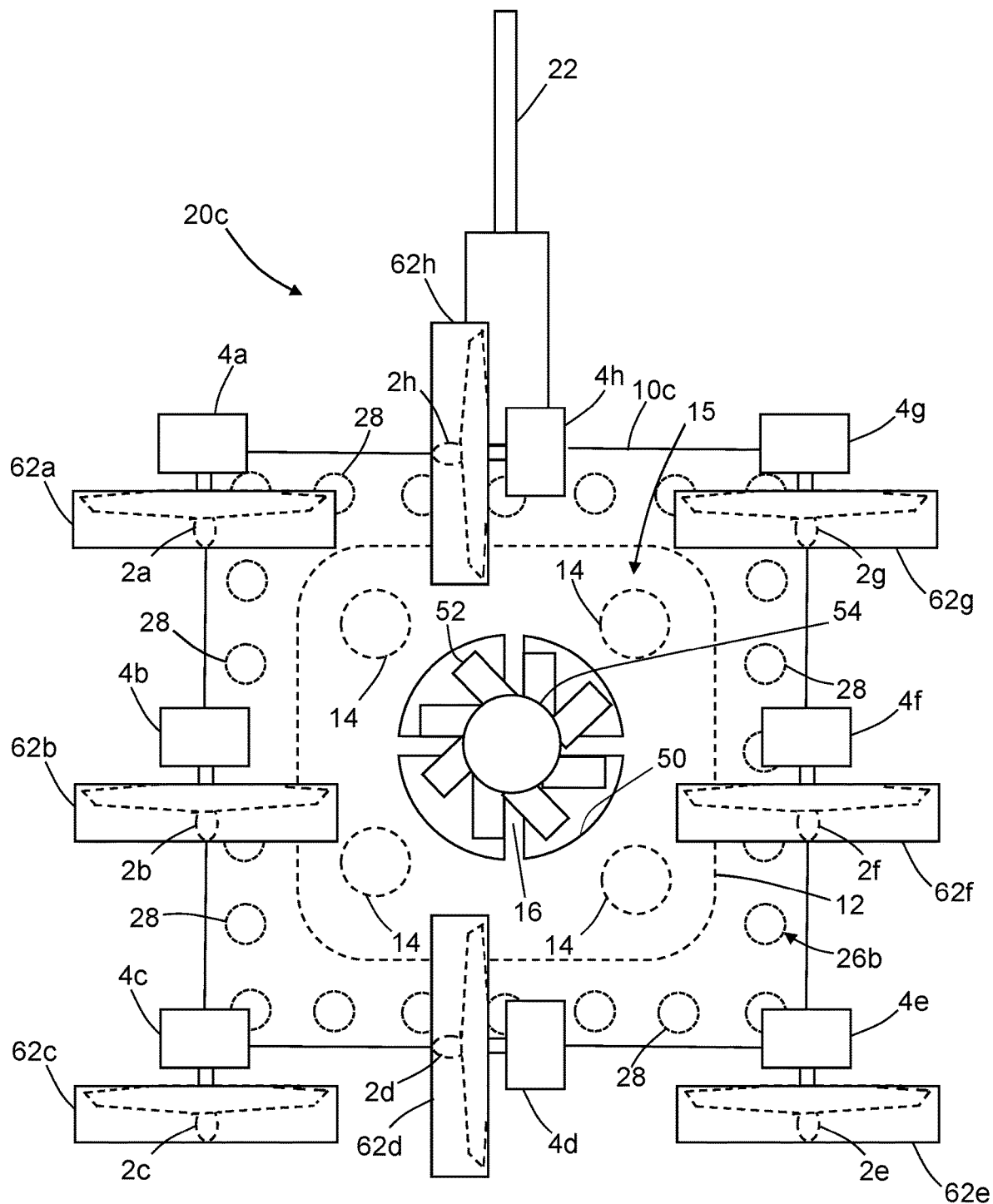
FIG. 9 is a diagram representing a plan view of a tool-equipped mobile platform having one adherence fan, eight propulsion fans and a two-dimensional array of sensors in accordance with another embodiment.

FIG. 9 is a diagram representing a plan view of a tool-equipped mobile platform 20c having one adherence fan 52, eight propulsion fans 2a-2h (indicated by dashed lines), and a rectangular array 26b of sensors 28 (indicated by dashed circles) in accordance with another embodiment. The base 10c of tool-equipped mobile platform 20c is attached to the end of an umbilical cable 22. The base 10c has a skirt 12 that bounds a suction zone 15 and four ball rollers 14 (indicated by dashed circles) disposed within the suction zone 15. The suction zone 15 is further bounded by the bottom surface of the base 10c and the confronting surface that the ball rollers 14 are in contact with. In alternative embodiments, the number of ball rollers may be three, five or more. Surface adherence is achieved by activating the adherence fan 52 to rotate in a direction that exhausts air from the suction zone 15. The propulsion fans 2a-2h may be mounted to respective static masts, in which case the directions of the fan propulsion thrust vectors would not vary relative to the frame of reference of the base 10c. In alternative embodiments, the propulsion fans 2a-2h may be mounted to respective rotatable turrets (as previously described) to enable the directions of the respective propulsion fan thrust vectors to be varied independently relative to the frame of reference of the base 10c. For the purpose of the following discussion, it will be assumed that the propulsion fans 2a-2h are mounted to respective static masts and have fixed orientations relative to the frame of reference of the base 10c. In the case of non-swivable propulsion fans, the position of the tool-equipped mobile platform 20c may be generally controlled by adjusting the respective thrusts of the propulsion fans. One specific example of such position control will now be described for the purpose of illustration.

The tool-equipped mobile platform 20c depicted in FIG. 9 has three propulsion fans 2a-2c on the left side of base 10c and three propulsion fans 2e-2g on the right side of base 10c. For the purpose of illustration, assume that the axes of rotation of propulsion fans 2a-2c and 2e-2g are mutually parallel. The tool-equipped mobile platform 20c also has one propulsion fan 2h on the top base 10c and one propulsion fan 2d on the bottom of base 10c which have mutually parallel axes of rotation. The axes of rotation of propulsion fans 2d and 2h are perpendicular to the axes of rotation of propulsion fans 2a-2c and 2e-2g. In the scenario depicted in FIG. 9, the propulsion fans 2a-2h may be operated in a manner such that the tool-equipped mobile platform 20c moves sideways at a constant elevation when the tool-equipped mobile platform 20c is adhered to a vertical surface. In this operational mode, the propulsion fans 2a-2c and 2e-2g are rotated in the same direction to produce a net lift sufficient to counteract the weight of the tool-equipped mobile platform 20c. In this "weightless" state (with no tension in the umbilical cable 22), the propulsion fans 2d and 2h may be rotated in the same direction to cause the tool-equipped mobile platform 20c to move to the left or right with constant elevation, e.g., when scanning a vertical surface during a non-destructive inspection. However, tool-equipped mobile platform 20c may also be used to scan on top of a horizontal surface—in which case no lift forces are needed and all of the propulsion fans 2a-2h may be selectively operated to provide a desired lateral movement of the tool-equipped mobile platform 20c along the horizontal surface. In instances wherein the tool-equipped mobile platform 20c is adhered to an inclined (neither horizontal nor vertical) surface which the weight of the tool-equipped mobile platform 20c is partially supported by the surface, the propulsion fans 2a-2c and 2e-2g may be rotated to produce a net propulsion force equal and opposite to a component of the weight vector which is parallel to the surface.

In alternative embodiments, the number of adherence fans may be increased to provide greater suction forces for increased surface adherence. For example, the tool-equipped mobile platform may be designed so that it is capable of adhering in an upside-down state to a horizontal surface that is facing downward. In the event that the tool-equipped mobile platform falls off the surface, the umbilical cable 22 will prevent the tool-equipped mobile platform from falling to the ground.

In the example embodiment depicted in FIG. 9, the rectangular array 26b of sensors 28 consists essentially of two pairs of linear arrays which are mutually perpendicular. The linear arrays are disposed along the four sides of the four-sided base 10c. This arrangement of spaced-apart pairs of parallel linear arrays allows the tool-equipped mobile platform 20c to scan a rectangular surface—including the margins of the surface adjacent to the surface edges—by translation up/down and sideways without rotation. For example, when the vertical row of sensors 28 on the left side of the base 10c depicted in FIG. 9 is adjacent to a left edge of the rectangular surface being inspected, the linear array vertical row of sensors 28 on the left side is able to scan the marginal area adjacent to the left edge of the rectangular surface (which marginal area would not be scannable if the vertical row of sensors were in the middle of base 10c). Conversely, when the vertical row of sensors 28 on the right side of the base 10c depicted in FIG. 9 is adjacent to a right edge of the rectangular surface being inspected, the linear array vertical row of sensors 28 on the right side is able to scan the marginal area adjacent to the right edge of the rectangular surface (which marginal area would not be scannable if the vertical row of sensors were in the middle of base 10c).

Figure 10:
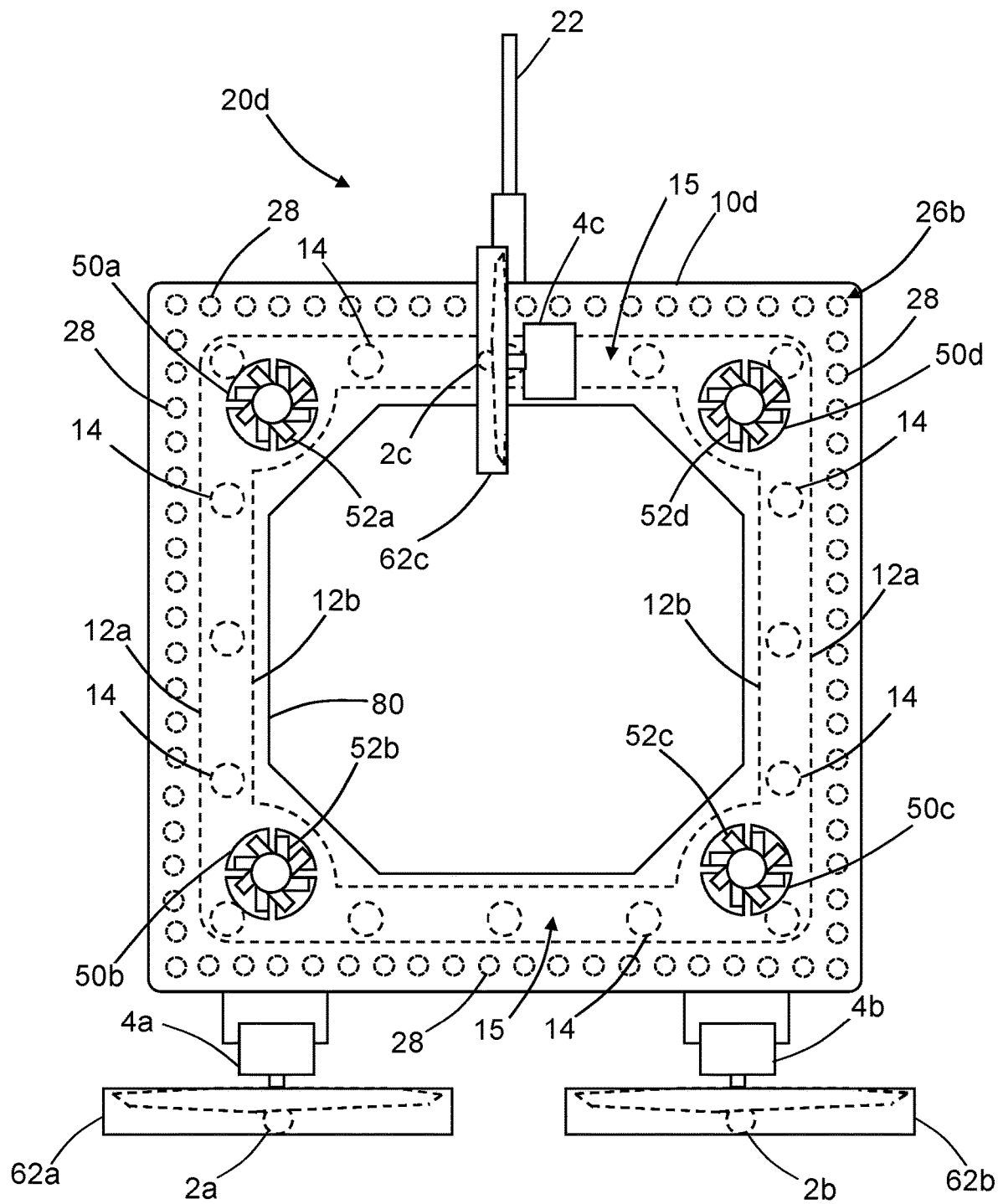
FIG. 10 is a diagram representing a plan view of a tool-equipped mobile platform having four adherence fans, three propulsion fans and a two-dimensional array of sensors in accordance with a further embodiment.

FIG. 10 is a diagram representing a plan view of a tool-equipped mobile plafform 20d having four adherence fans 52a-52d, three propulsion fans 2a-2c (indicated by dashed lines), and a rectangular array 26b of sensors 28 (indicated by small dashed circles) in accordance with a further embodiment. The base 10b of the tool-equipped mobile plafform 20d is attached to the end of an umbilical cable 22. In this embodiment, the base 10d has an octagonal central opening 80 and four openings 50a-50d having circular cross sections. The four adherence fans 52a-52d are respectively situated at the top of the openings 50a-50d. The openings 50a-50d are in fluid communication with a suction zone 15 that surrounds the central opening 80. The rectangular array 26b of sensors 28 surrounds the suction zone 15. The rectangular array may be square. The square shape, with an open hole (reinforced at the corners, thus producing the octagonal shape) is a reasonable design for the purpose intended. The octagonal central opening 80 lightens the platform when the design enables the inclusion of plural linear arrays of sensors in orthogonal directions. For example, in alternative embodiments, the base may be designed to support an L- or T-shaped set of linear arrays, but the ability to get to edges would be reduced and more frequent turning may be in order. The tool-equipped mobile platform 20d depicted in FIG. 10 further includes an outer skirt 12a and an inner skirt 12b (indicated by respective dashed lines) that are attached to and project out of the base 10d toward the confronting surface., The outer and inner skirts 12a and 12b bound the suction zone 15. The tool-equipped mobile platform 20d further includes sixteen ball rollers 14 (indicated by dashed circles) disposed within the suction zone 15. The suction zone 15 is further bounded by the bottom surface of the base 10d and the confronting surface that the ball rollers 14 are in contact with. In alternative embodiments, the number of ball rollers may be more than or fewer than sixteen. Surface adherence is achieved by activating the adherence fans 52a-52d to rotate in a direction that exhausts air from the suction zone 15.

The propulsion fans 2a-2c may be mounted to respective static masts or to respective rotatable turrets. For the purpose of the following discussion, it will be assumed that the propulsion fans 2a-2c are mounted to respective static masts and have fixed orientations relative to the frame of reference of the base 10d. The tool-equipped mobile platform 20d depicted in FIG. 10 has two propulsion fans 2a and 2b on the bottom side of base 10d and one propulsion fan 2c on the top side of base 10d. For the purpose of illustration, assume that the axes of rotation of propulsion fans 2a and 2b are mutually parallel and that the axis of rotation of propulsion fan 2c is perpendicular to the axes of rotation of propulsion fans 2a and 2b. In the scenario depicted in FIG. 10, the propulsion fans 2a-2c may be operated in a manner such that the tool-equipped mobile platform 20d moves sideways at a constant elevation when the tool-equipped mobile platform 20d is adhered to a vertical surface. In this operational mode, the propulsion fans 2a and 2b are rotated in the same direction to produce a net lift sufficient to counteract the weight of the tool-equipped mobile platform 20d. In this "weightless" state (with no tension in the umbilical cable 22), the propulsion fan 2c may be rotated to propel the tool-equipped mobile platform 20d to the left or right with constant elevation.

Figure 11:
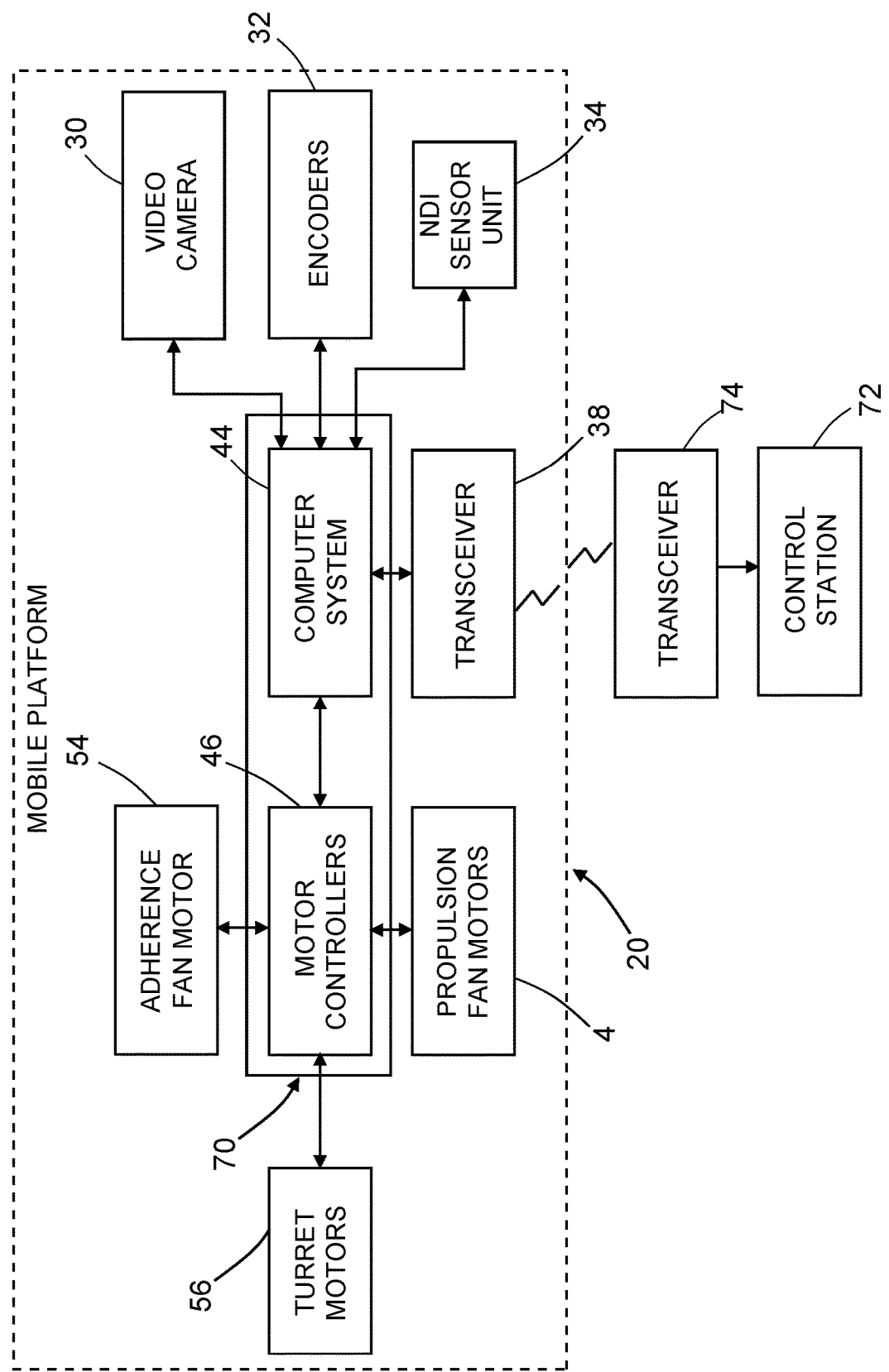
FIG. 11 is a block diagram identifying some components of a mobile platform equipped with two inspection tools, including an NDI sensor unit and a video camera.

FIG. 11 is a block diagram identifying some components of a fan-propelled surface-adhering mobile platform 20 equipped with two inspection tools, including an NDI sensor unit 34 and a video camera 30. The tool-equipped mobile platform 20 includes a controller 70 that is configured to control platform movements and tool operations. For example, the controller 70 controls the operation of an adherence fan motor 54, propulsion fan motors 4 and turret motors 56 which drive rotations of the turrets (e.g., turrets 6a and 6b depicted in FIG. 5). The controller 70 receives electrical power from a power source on the ground via the umbilical cable 22 (not shown in FIG. 11).

More specifically, the controller 70 may include respective motor controllers (a.k.a. electronic speed control circuits) for controlling the rotational speeds of the various motors. In the embodiment depicted in FIG. 11, the controller 70 includes a computer system 44 and a plurality of motor controllers 46. The motor controllers 46 may take the form of electronic speed control circuits configured to vary an electric motor's speed, direction and braking. Such electronic speed controllers provide high-frequency, high-resolution three-phase AC power to the motors, which are preferably brushless electric motors.

In one proposed implementation, the computer system 44 is configured with various software modules, including a software module that controls platform movements and a software module that controls the NDI sensor unit 34. (The sensors 28 shown in FIGS. 4 and 8-10 are components of the NDI sensor unit 34 shown in FIG. 11.) The computer system 44 sends information to the motor controllers 46 for controlling the revolutions per minute and rotation direction of each motor. For example, the computer system 44 may be programmed to coordinate the operation of all fan propulsion motors so that the mobile platform 20 follows a prescribed scanning path along the surface of the structure being inspected.

The mobile platform 20 may also include a plurality of encoders 32. As the mobile platform 20 scans across the surface of a structure, the position of the sensor 28 may be tracked using the encoders 32. For example, the encoders 32 may be configured to output respective pulses in response to each incremental movement in the X and Y directions. In one proposed implementation, the standoff contact elements may be rotary encoders. For higher fidelity, the encoders 32 may be supplemented with an off-board positioning method, such as tracking using a local positioning system or motion capture using cameras.

The mobile platform 20 may also be equipped with a video camera 30 that operates under the control of the computer system 44. More specifically, the video camera 30 may be activated by the computer system 44 to acquire an image and then send the image data back to the computer system 44 for storage and later transmission to the ground station.

In the embodiment partly depicted in FIG. 11, the mobile platform 20, the video camera 30 and the NDI sensor unit 34 are controlled by the computer system 44 as a function of radiofrequency commands transmitted by a control station 72. Those radiofrequency commands are transmitted by a transceiver 74 on the ground; received by a transceiver 38 onboard the mobile platform 20; converted by the transceiver 38 into the proper digital format; and then forwarded to the computer system 44. The control station 72 may comprise a general-purpose computer system configured with programming for controlling the movements of the mobile platform 20 and the operation of the NDI sensor unit 34. For example, the movements of the mobile platform 20 can be controlled using a joystick, keyboard, mouse, touchpad, or touchscreen of a computer system at the control station 72 or other user interface hardware (e.g., a gamepad). In addition, the computer system at the control station 72 is configured with programming for processing data received from the mobile platform 20 during an inspection operation. In particular, the computer system of the control station 72 may comprise a display processor configured with software for controlling a display monitor (not shown in FIG. 11) to display images acquired by the video camera 30. The optical image field, as sighted by a video camera 30 onboard the mobile platform 20, can be displayed on the display monitor.

Figure 12:
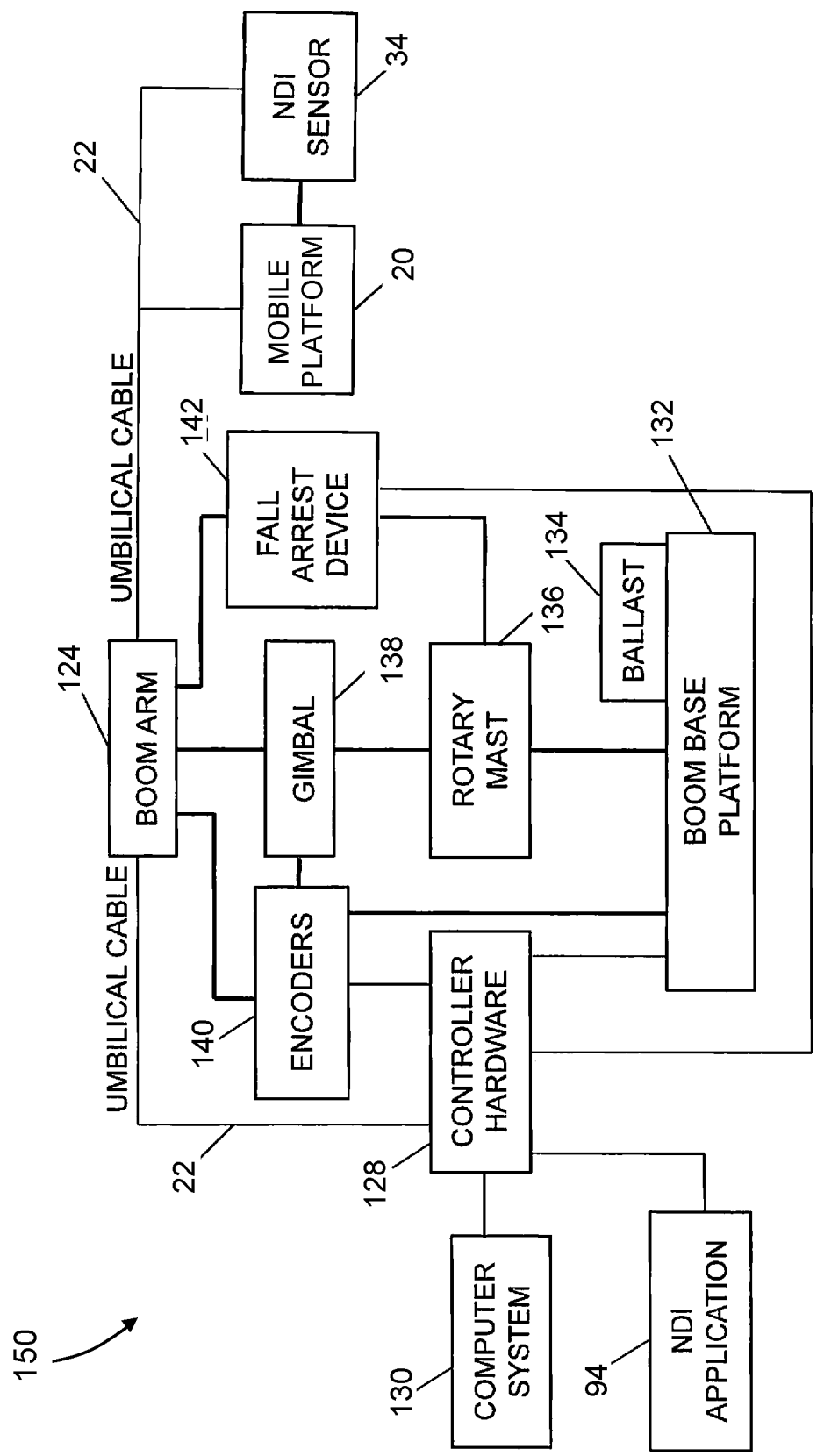
FIG. 12 is a block diagram showing connections between selected components of a mobile boom system for managing an umbilical cable in accordance with one embodiment.

In accordance with some embodiments, the tool-equipped mobile platform may be attached to an umbilical cable 22 that is fed to the inspection site using a mobile boom system. FIG. 12 is a block diagram showing mechanical and electrical connections between selected components of a mobile boom system 150 for managing an umbilical cable 22 in accordance with one embodiment. The mechanical connections are indicated by boldface line segments between blocks.

As depicted in FIG. 12, the mobile boom system 150 includes a boom base platform 132 that carries ballast 134 and a rotary mast 136 (it may optionally also carry a tension reel). The mobile boom system 150 further includes a boom arm 124 which is mounted to the rotary mast 136 via a gimbal 138. A mobile platform 20, carrying an NDI sensor unit 34, is connected to one end of the umbilical cable 22. An intermediate portion of the umbilical cable 22 passes through a hollow center of the boom arm 124. A fall arrest device 142 is provided for damping downward motion of the distal end of boom arm 124 in the event that the mobile platform 20 falls off of the object (not shown) which is being inspected (e.g., a fuselage of an aircraft).

The mechanical movements of various components of the mobile boom system 150 can be measured using encoders 140. The encoder pulses are received by controller hardware 128 (which is part of the electrical subsystem). For example, encoders 140 may be provided for measuring the pan and tilt angles of the gimbal 138, the rotations of the wheels of the boom base platform 132, and the position of movable counterweights (not shown) along the boom arm 124. The counterweights move under automated motorized control for balancing the boom arm 124.

In addition, the umbilical cable 22 includes electrical lines connecting the NDI sensor unit 34 and the computer system onboard the mobile platform 20 to the controller hardware 128. For example, the NDI sensor unit 34 may comprise an array of ultrasonic transducers for inspecting the surface to which the mobile platform 20 is adhered. In alternative embodiments, the mobile platform 20 may carry other types of maintenance tools.

Still referring to FIG. 12, the motion control system comprises a computer system 130 (onboard the boom base platform 132) programmed with motion control application software. The controller hardware 128 contains the system power supplies, relays, and data acquisition devices, integrates all the NDI sensor control connections, and provides an interface between the computer system 130 and the mobile platform 20. The computer system 130 may comprise a general-purpose computer programmed with motion control application software comprising respective software modules for controlling the motors of the mobile boom system 150 and the mobile platform 20.

For the NDI embodiment depicted in FIG. 12, the control system may further comprise a separate ground-based computer that hosts NDI scan application software 94. For example, the NDI scan application software 94 may include ultrasonic data acquisition and display software that controls an ultrasonic pulser/receiver unit (not shown) which sends pulses to and receives return signals from the NDI sensor unit 34 via the umbilical cable 22. The NDI scan application software 94 controls all details of the scan data and the display of data.

The motion control application software residing in computer system 130 also enables control of an umbilical cable motor of an umbilical cable management system (not shown in FIG. 12). The umbilical cable management system automatically feeds out the umbilical cable 22 or pulls in the slack as the mobile platform 20 moves. For example, the umbilical cable management system may comprise a pair of pinch rollers—driven by an umbilical cable motor—that grip the umbilical cable 22, as disclosed in U.S. Pat. No. 9,464,754. The umbilical cable motor is under the control of computer system 130, which is programmed with motion control software that synchronizes the extension/retraction of the umbilical cable 22 with the movement of the mobile platform 20, extending or retracting the umbilical cable 22 as needed to maintain slack without motion constraint.

Figure 13:
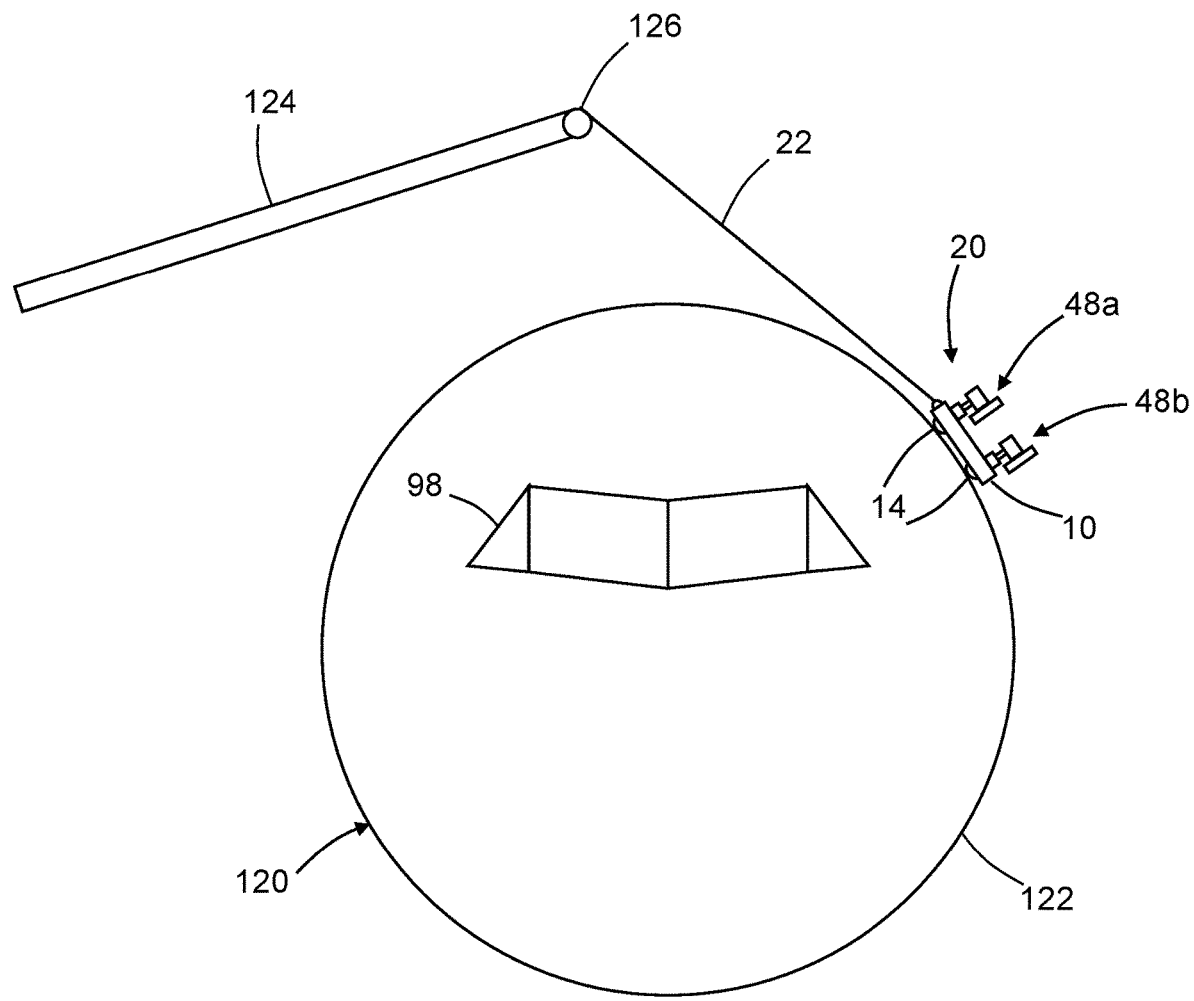
FIG. 13 is a diagram representing a front end view of an aircraft fuselage at an instant in time during an automated maintenance procedure performed using a surface-adhered, fan-propelled, tool-equipped mobile platform suspended by a primary umbilical cable using the mobile boom system partly represented in FIG. 12.

FIG. 13 is a diagram representing a front end view of an aircraft fuselage 120 having a flight deck windshield 98. The aircraft fuselage 120 is depicted at an instant in time during an automated maintenance procedure performed using the mobile boom system 150 partly represented in FIG. 12 and a tool-equipped mobile platform 20 suspended from an umbilical cable 22. The mobile boom system 150 includes a boom arm 124 in the form of a tube. The umbilical cable 22 passes through the boom arm 124 and wraps around a portion of a pulley 126 rotatably coupled to the distal end of the boom arm 124. The pulley 126 facilitates pay-out and take-up of the umbilical cable 22 in the manner described in U.S. Pat. No. 9,410,659. A power/signal cord (not shown in FIG. 13) may be attached to or incorporated in the umbilical cable 22 for enabling a ground-based control computer to communicate with a computer onboard the tool-equipped mobile platform 20 and for supplying electrical power to the tool-equipped mobile platform 20.

The tool-equipped mobile platform 20 includes a pair of pivotable propulsion units 48a and 48b carried by a base 10 (such as mobile platform 20a seen in FIG. 4). After the tool-equipped mobile platform 20 has been lowered into position by extension of the umbilical cable 22, the adherence fan (not visible in FIG. 13) is activated to adhere the base 10 to an external surface 122 of the aircraft fuselage 120 while maintaining a plurality of ball rollers 14 in contact with external surface 122. Then the pivotable propulsion units 48a and 48b may be activated to generate a net thrust to cause the base 10 to move along a specified scan path. The maintenance tool (not shown in FIG. 13) carried by mobile platform 20 may be activated to perform a maintenance function. In the case of NDI, the acquired NDI data may be transmitted to a ground-based control computer (not shown in FIG. 13) either wirelessly or via the umbilical cable 22.

The computer system onboard the mobile platform 20 may be configured to control the movements of the mobile platform 20 and the operations of the maintenance tool (not visible in FIG. 13) such that the maintenance operation is performed intermittently at successive spaced-apart locations of the mobile platform or continuously along a scan path followed by the mobile platform. If the maintenance operations are performed continuously along a scan path, then the mobile platform 20 may propelled along a scan path from a first location to a second location while maintaining the plurality of standoff contact elements in contact with the surface of the structure undergoing maintenance. While the mobile platform 20 is moving away from the first location to the second location, the maintenance tool may be activated to repeatedly perform a maintenance operation. In contrast, if the maintenance operations are performed intermittently at successive spaced-apart locations, then the maintenance tool may be activated to perform a first maintenance operation while the mobile platform 20 is at stopped at the first location and then perform a second maintenance operation while the mobile platform 20 is stopped at the second location.

Figure 14A:
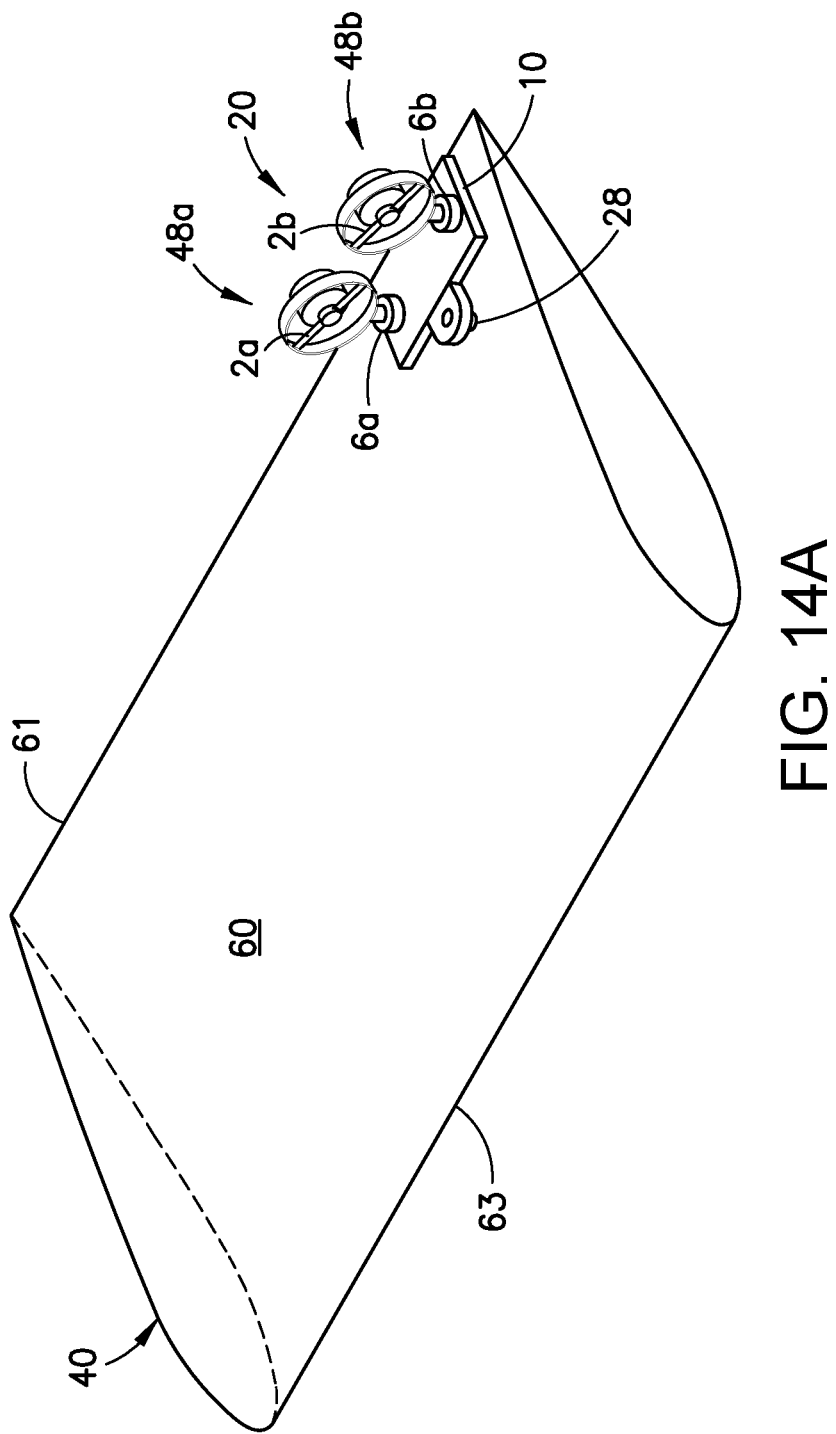
FIGS. 14A through 14D are diagrams representing respective three-dimensional views of a fan-propelled mobile platform at four successive positions during scanning of a surface of a helicopter blade.
Figure 14B:
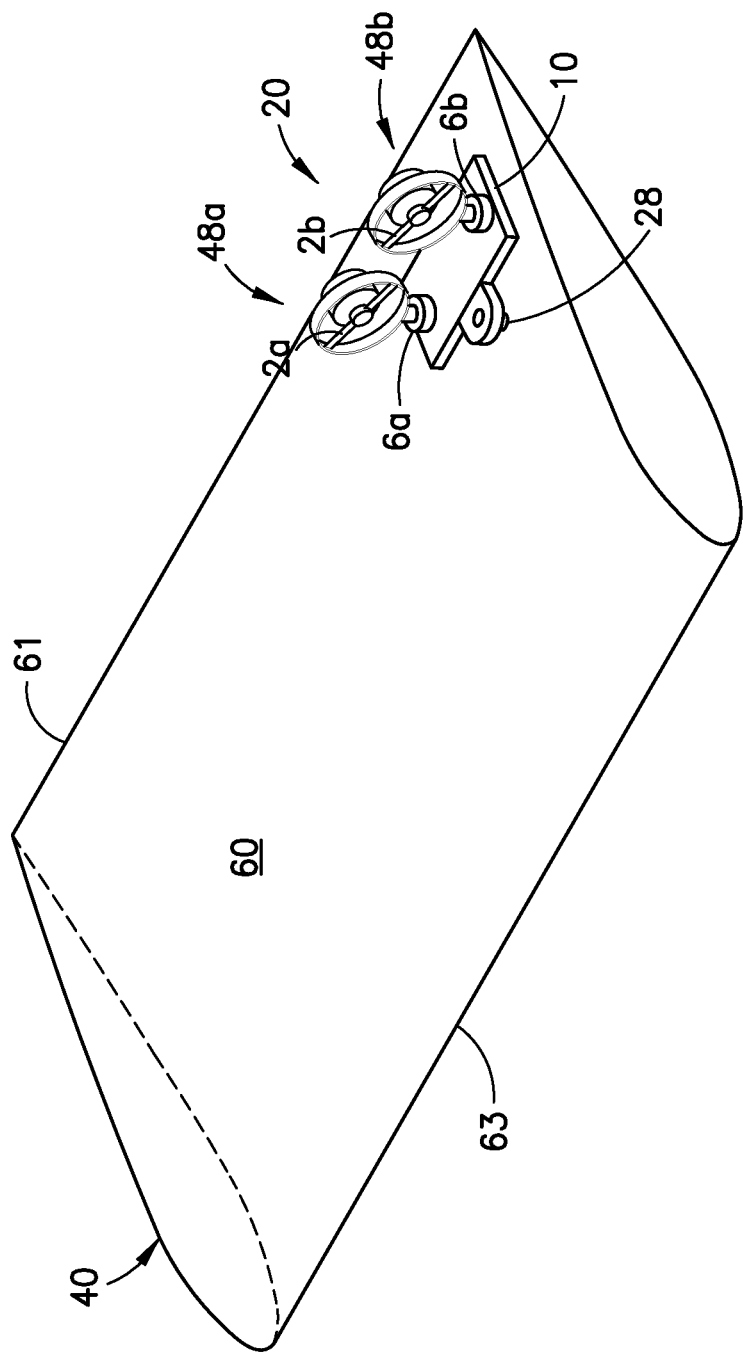
Figure 14C:
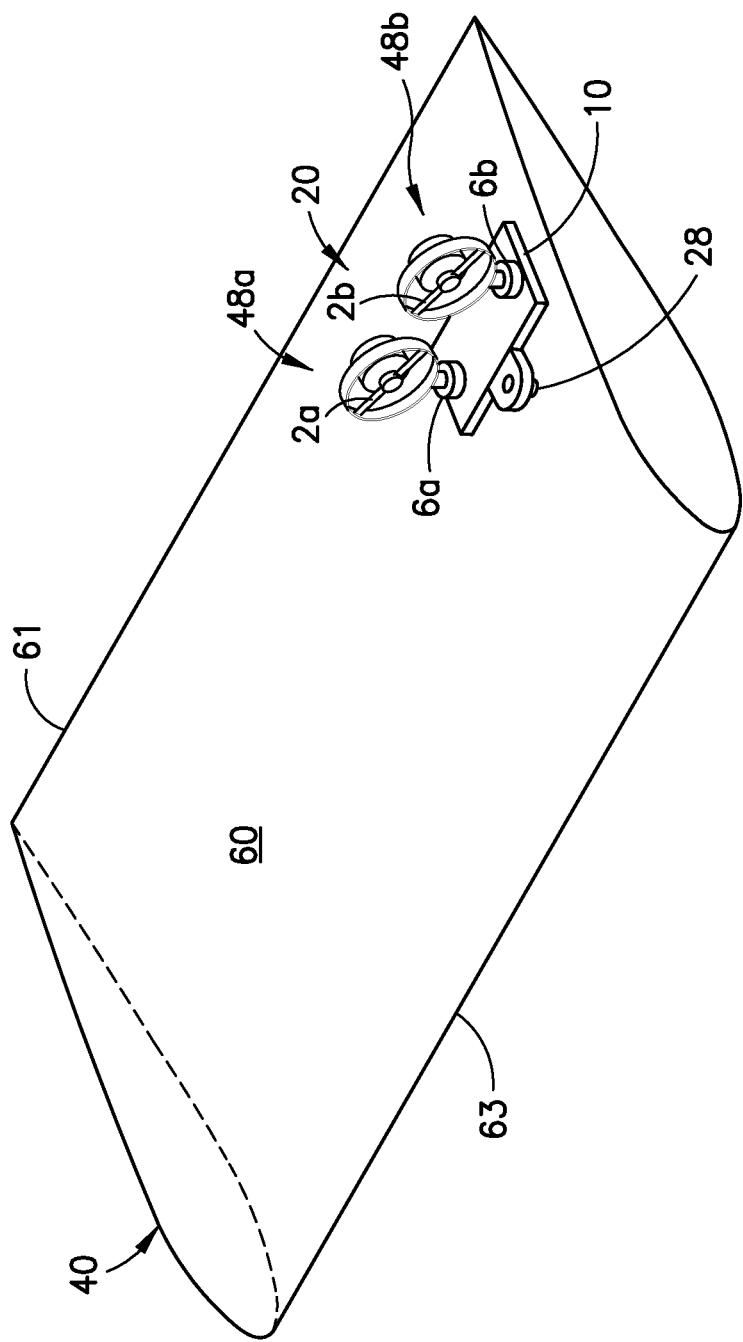
Figure 14D:
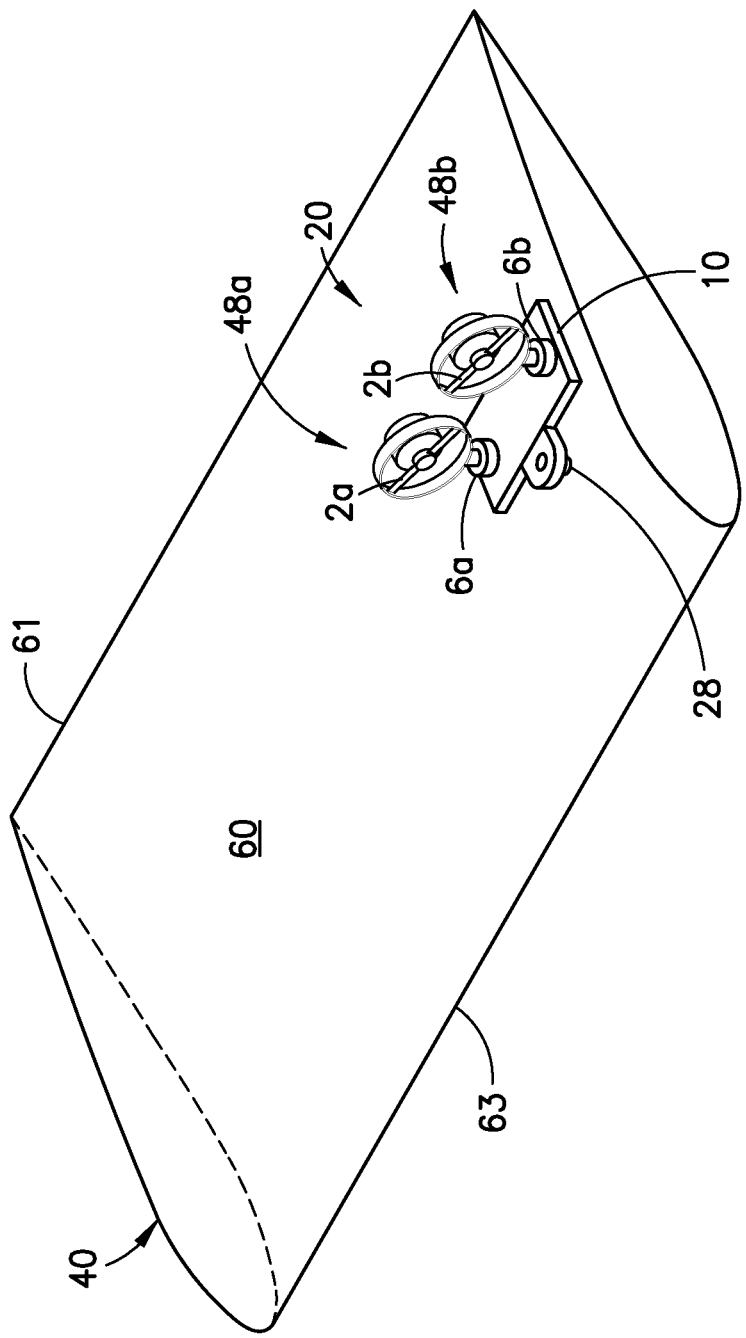

The fan-propelled tool-equipped platforms disclosed herein may also be used to perform a maintenance function on a helicopter blade. FIGS. 14A through 14D are diagrams representing respective three-dimensional views of a mobile platform 20 at four successive positions during scanning of a surface 60 of a helicopter blade 40. In this example, the mobile platform 20 has two pivotable propulsion units 48a and 48b and a sensor 28 mounted to a base 10. FIG. 14A shows the mobile platform 20 at a first location adjacent to a trailing edge 61 of the helicopter blade 40. The pivotable propulsion units 48a and 48b may be oriented so that the axes of rotation of the respective propulsion fans 2a and 2b are parallel to a chordwise direction of the helicopter blade 40. Then the propulsion fans 2a and 2b are rotated in a direction to produce a net thrust that causes the mobile platform 20 to displace toward the leading edge 63 and away from the trailing edge 61 of the helicopter blade 40. FIG. 14B shows the mobile platform 20 at a second location separated from the first location by a first distance. FIG. 14C shows the mobile platform 20 at a third location displaced from the first location by a second distance greater than the first distance. FIG. 14D shows the mobile platform 20 at a fourth location displaced from the first location by a third distance greater than the second distance.

The sensor 28 may be moved along a scan path that follows the surface 60 of the helicopter blade 40. The sensor 28 may be activated to acquire NDI sensor data representing characteristics of the helicopter blade 40 during movement of the sensor 28 along the scan path. This technique may be used to inspect a helicopter blade 40 (or other airfoil-shaped body, such as a wind turbine blade or aircraft wing) wherein the mobile platform 20 circumnavigates the helicopter blade 40 except at the angled trailing edge 61. For example, the mobile platform 20 may adhere to a surface of the leading edge 63 as the mobile platform 20 moves from one side of the helicopter blade 40 to the other side of the helicopter blade 40, acquiring a swath of sensor data intermittently or continuously as the mobile platform 20 travels around the helicopter blade 40 from the first location seen in FIG. 14A to a final location adjacent to the trailing edge 61, but on the other side of the helicopter blade 40.

The fan-propelled mobile platforms disclosed herein may be equipped with different types of maintenance tools. The apparatus disclosed herein can be adapted for use in the automation of various maintenance functions, including but not limited to: nondestructive inspection, painting, light sanding, cleaning, drilling (with a suction cup attachment to react the drill forces), target attachment (motion capture targets, NDI targets, visual survey targets), decal attachment, damage marking (to denote the outer extent of visible or inspected damage), placement of materials (repair adhesive, repair composite plies, release film, breather material, vacuum bag), and application of repair adhesive tape. Additional maintenance functions which could be performed using a fan-propelled mobile platform include coating removal using abrasive pellets, laser ablation, chemical treatment, etc. as well as surface treatments for corrosion prevention, abrasion resistance or application of specialized coatings. The different types of NDI functions which may be performed using a fan-propelled mobile platform include ultrasonic and eddy current inspection techniques, optical imaging, infrared thermography, laser shearography, and digital radiography. Such image-based sensing methods require some standoff with the structure being inspected. For example, an imager or two-dimensional detector array may be supported by the base 10 at a small distance away from the structure.

Multiple mobile platforms of the types described above can be used at the same time during maintenance operations at large structures. For example, a plurality of tool-equipped mobile platforms may be moved around a structure requiring periodic inspection. Such a system includes a computer system for controlling the movements of the mobile platforms, the operations of the maintenance tools and the acquisition of data. In accordance with one embodiment, each mobile platform includes an onboard system that is able to navigate the mobile platform in accordance with a preprogrammed scan path and control an NDI sensor unit to acquire NDI sensor data while the mobile platform is rolling or sliding along a surface of the structure being inspected. The preprogrammed scan path carried by each mobile platform enables each mobile platform to follow a respective unique scan path around a portion of the structure being inspected. Thus, it will be appreciated that the preprogrammed scan path for each mobile platform is unique and formed with respect to a designated portion of the structure to be inspected. Generally, the greater the number of mobile platforms employed in any given inspection task, the shorter the duration of time to complete the inspection task.

For example, a plurality of NDI sensor unit-equipped mobile platforms may be deployed to form an inspection "swarm". When the mobile platforms are adhered to surfaces of the structure to be inspected, each mobile platform begins acquiring NDI sensor data for the portion of the structure which that mobile platform has been designated to inspect. In one proposed implementation, the mobile platforms transmit their acquired NDI sensor data to a control station via transceivers and antennas. Alternatively the mobile platforms could each store their acquired NDI sensor data in a non-transitory tangible computer-readable storage medium onboard the mobile platform for future downloading.

The tool-equipped mobile platforms disclosed herein do not rely on traction on the surface like the traditional crawling robot, so the mobile platform may traverse dirty or wet surfaces without slippage or danger of falling. Scanning can be done at a low cost relative to many other approaches, and still be automated and rapid. In accordance with some embodiments, the mobile platform is equipped with an NDI sensor unit for enabling full mobile platform-based scanning inspection of structures and eliminating on-structure drive approaches for NDI. The mobile platform is configured to place the NDI sensor unit in contact with or in proximity to a surface of a structure being inspected and then scanning the NDI sensor unit across that surface while maintaining contact or proximity.

In cases where the maintenance operation is NDI, NDI sensor data is collected during the scanning while being simultaneously tied to (correlated with) the measured position, and stored in a non-transitory tangible computer-readable storage medium onboard the mobile platform or transferred wirelessly to a separate computer on the ground. Multiple maintenance tool-equipped mobile platforms may be used at the same time, as long as their relative positions are checked and controlled to avoid collision.

While methods for automated maintenance of structures using a fan-propelled mobile platform have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "location" comprises position in a three-dimensional coordinate system and orientation relative to that coordinate system.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a computer system, cause the tool-equipped unmanned aerial vehicle to perform at least a portion of the methods described herein.

The invention claimed is:

1. A mobile platform for performing maintenance operations, comprising:
   a base having a first opening;
   a first skirt attached to or integrally formed with the base and surrounding the first opening in the base, the first skirt bounding a suction zone that is in fluid communication with the first opening;
   a maintenance tool mounted to the base;
   a first adherence fan rotatably coupled to the base and disposed to remove air from the suction zone via the first opening in the base;
   a first adherence fan motor operatively coupled for driving rotation of the first adherence fan;
   first and second propulsion fans having axes of rotation which are generally parallel to the base;
   first and second propulsion fan motors operatively coupled for driving rotation of the first and second propulsion fans respectively; and
   a controller configured to control the operation of the first adherence fan motor and the first and second propulsion fan motors.

2. The mobile platform as recited in claim 1, further comprising:
   first and second turrets rotatably coupled to the base and fixedly coupled to the first and second propulsion fan motors respectively; and
   first and second turret motors operatively coupled for driving rotation of the first and second turrets respectively, thereby enabling the first and second propulsion fan motors to swivel about respective axes of rotation under the control of the controller.

3. The mobile platform as recited in claim 2, wherein the first opening is disposed between the first and second turrets.

4. The mobile platform as recited in claim 1, further comprising a plurality of standoff contact elements attached to the base.

5. The mobile platform as recited in claim 4, wherein the plurality of standoff contact elements are ball rollers.

6. The mobile platform as recited in claim 4, wherein the plurality of standoff contact elements have surfaces suitable for sliding along a continuous surface of a structure.

7. The mobile platform as recited in claim 1, wherein the maintenance tool comprises a plurality of sensors.

8. The mobile platform as recited in claim 1, wherein the base has a second opening and the mobile platform further comprises :
a second adherence fan rotatably coupled to the base and disposed to remove air from the suction zone via the second opening in the base; and
a second adherence fan motor operatively coupled for driving rotation of the second adherence fan.

9. The mobile platform as recited in claim 1, wherein the mobile platform further comprises:
a second skirt attached to or integrally formed with the base and surrounded by the first skirt with the first opening therebetween, the suction zone being bounded by the first and second skirts and in fluid communication with the first opening.

10. The mobile platform as recited in claim 1, wherein the base is made of semi-rigid material.

11. A system for performing maintenance operations, comprising an umbilical cable and a first mobile platform attached to the umbilical cable, the first mobile platform comprising:
a first base having an opening;
a skirt attached to or integrally formed with the first base and surrounding the opening in the first base, the skirt bounding a suction zone that is in fluid communication with the opening;
a maintenance tool mounted to the first base;
an adherence fan rotatably coupled to the first base and disposed to remove air from the suction zone via the opening in the first base;
an adherence fan motor operatively coupled for driving rotation of the adherence fan;
first and second propulsion fans having axes of rotation which are generally parallel to the base;
first and second propulsion fan motors operatively coupled for driving rotation of the first and second propulsion fans respectively; and
a controller configured to control the operation of the adherence fan motor and the first and second propulsion fan motors to enable concurrent surface adherence and fan propulsion.

12. The system as recited in claim 11, further comprising a second mobile platform configured to manage extension and retraction of the umbilical cable, wherein the second mobile platform comprises a second base and a spool mounted to the second base, a first portion of the umbilical cable being wound on the spool and a second portion of the umbilical cable extending between the spool and the first base of the first mobile platform.

13. The system as recited in claim 12, wherein the second mobile platform further comprises a boom arm that supports the second portion of the umbilical cable.

14. The system as recited in claim 12, wherein the second mobile platform further comprises a plurality of wheels rotatably coupled to the second base.

15. The system as recited in claim 12, wherein the second mobile platform further comprises a plurality of propulsion fans.

16. The system as recited in claim 12, further comprising:
first and second turrets rotatably coupled to the first base and fixedly coupled to the first and second propulsion fan motors respectively; and
first and second turret motors operatively coupled for driving rotation of the first and second turrets respectively, thereby enabling the first and second propulsion fan motors to swivel about respective axes of rotation under the control of the controller.

17. The system as recited in claim 12, further comprising a plurality of standoff contact elements attached to the first base.

18. A method for automated maintenance of a structure, comprising:
(a) attaching a tool-equipped mobile platform to one end of an umbilical cable;
(b) suspending the attached tool-equipped mobile platform from the umbilical cable in a position adjacent to a surface of a structure;
(c) moving the suspended tool-equipped mobile platform into proximity with the surface;
(d) adhering the tool-equipped mobile platform to the surface using one or more fans to produce suction in a suction zone between the surface and a base of the tool-equipped mobile platform;
(e) propelling the adhered tool-equipped mobile platform to a first location on the surface by means of thrust produced by propulsion fans of the tool-equipped mobile platform; and
(f) operating a maintenance tool of the tool-equipped mobile platform to perform a maintenance operation while the tool-equipped mobile platform is at the first location.

19. The method as recited in claim 18, wherein step (c) comprises moving the suspended tool-equipped mobile platform into contact with the surface, the tool-equipped mobile platform remaining in contact with and adhered to the surface during steps (e) and (f).

20. The method as recited in claim 18, further comprising the following steps performed upon completion of step (f):
(g) propelling the adhered tool-equipped mobile platform from the first location to a second location on the surface by means of thrust produced by the propulsion fans of the tool-equipped mobile platform; and
(h) operating the maintenance tool of the tool-equipped mobile platform to perform a maintenance operation while the tool-equipped mobile platform is at the second location.

21. The method as recited in claim 20, wherein the maintenance tool is a sensor array, step (g) comprises moving the sensor array along a scan path that follows the surface of the structure, and step (h) comprises using the sensor array to acquire sensor data representing characteristics of the structure along the scan path while the fans propel the tool-equipped mobile platform from the first location to the second location.

* * * * *